United States Patent
Ng et al.

(10) Patent No.: US 10,148,369 B2
(45) Date of Patent: Dec. 4, 2018

(54) SYSTEM AND METHOD FOR TIMING ALIGNMENT OF LTE CELLS AND INTER-OPERATOR CO-EXISTENCE ON UNLICENSED SPECTRUM

(71) Applicant: Samsung Electronics Co., Ltd., Suwon-si, Gyeonggi-do (KR)

(72) Inventors: Boon Loong Ng, Dallas, TX (US); Thomas David Novlan, Dallas, TX (US); Jianzhong Zhang, Plano, TX (US); Ying Li, Richardson, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 456 days.

(21) Appl. No.: 14/702,247

(22) Filed: May 1, 2015

(65) Prior Publication Data

US 2015/0319701 A1 Nov. 5, 2015

Related U.S. Application Data

(60) Provisional application No. 61/987,312, filed on May 1, 2014, provisional application No. 62/105,504, filed (Continued)

(51) Int. Cl.
*H04W 72/04* (2009.01)
*H04B 17/318* (2015.01)
(Continued)

(52) U.S. Cl.
CPC .......... *H04B 17/318* (2015.01); *H04B 17/18* (2015.01); *H04L 5/005* (2013.01); *H04W 8/005* (2013.01);
(Continued)

(58) Field of Classification Search
CPC ............. H04W 52/143; H04W 72/042; H04W 76/048; H04W 8/005; H04B 17/318; H04B 17/18; H04L 5/005
See application file for complete search history.

(56) References Cited

U.S. PATENT DOCUMENTS

| | | | |
|---|---|---|---|
| 2011/0292854 A1* | 12/2011 | Terry | H04L 5/001 370/311 |
| 2013/0121189 A1 | 5/2013 | Bhattad et al. | |

(Continued)

FOREIGN PATENT DOCUMENTS

| | | |
|---|---|---|
| CN | 101925193 A | 12/2010 |
| WO | 2013179095 A1 | 12/2013 |
| WO | 2014048596 A1 | 4/2014 |

OTHER PUBLICATIONS

Chinese Office Action for Chinese Application No. 201580022099.8, dated Dec. 5, 2017. (12 pages).
(Continued)

*Primary Examiner* — Hashim S Bhatti

(57) ABSTRACT

An eNodeB operated by a first operator is able to align an ON-OFF cycle operation for interference avoidance. The eNodeB receives, from another eNodeB operated by a second operator a physical broadcast channel (PBCH) and a physical downlink shared channel (PDSCH). A transmission coverage of the eNodeB partially overlaps with a transmission coverage of the other eNodeB. The PBCH carries a master information block (MIB), and the PDSCH carries a single system information block (SIB) identifying available unlicensed channel and including public land mobile network (PLMN) identities for networks operating using the unlicensed channel. The eNodeB uses the MIB and SIB1 to identify that the second eNodeB is operated by the second operator.

13 Claims, 10 Drawing Sheets

Related U.S. Application Data on Jan. 20, 2015, provisional application No. 62/105,519, filed on Jan. 20, 2015.

(51) Int. Cl.
*H04W 52/14* (2009.01)
*H04W 8/00* (2009.01)
*H04B 17/18* (2015.01)
*H04L 5/00* (2006.01)

(52) U.S. Cl.
CPC ....... *H04W 52/143* (2013.01); *H04W 72/042* (2013.01)

(56) References Cited

U.S. PATENT DOCUMENTS

| | | | |
|---|---|---|---|
| 2013/0208587 A1* | 8/2013 | Bala | H04W 16/14 370/230 |
| 2013/0279355 A1 | 10/2013 | Sadek et al. | |
| 2013/0295946 A1* | 11/2013 | Panchal | H04W 16/14 455/452.1 |
| 2014/0307603 A1* | 10/2014 | Barany | H04W 52/02 370/311 |
| 2015/0126207 A1 | 5/2015 | Li et al. | |
| 2015/0201375 A1* | 7/2015 | Vannithamby | H04W 24/04 370/311 |
| 2015/0223245 A1* | 8/2015 | Cheng | H04W 48/16 370/329 |
| 2015/0249531 A1 | 9/2015 | Lindoff et al. | |

OTHER PUBLICATIONS

Extended European Search Report for European Application No. 15785931.5, dated Nov. 3, 2017. (5 pages).

International Search Report issued for PCT/KR2015/004479 dated Jul. 28, 2015, 3 pgs.

Panasonic, "The Procedure for Small Cell On/Off Time Transition (handover and DRX)", R1-141214, 3GPP TSG RAN WG1 Meeting #76bis, Mar. 21, 2014, 5 pgs.

NSN, Nokia, "Procedures for Small Cell On/Off Time Reduction", R1-140557, 3GPP TSG-RAN WG1 Meeting #76, Feb. 1, 2014, 3 pgs.

Samsung, "Discussion on the Detection Timing of Small Cell Discovery Signal", R1-140371, 3GPP TSG RAN WG1 Meeting #76, Feb. 1, 2014, 3 pgs.

Lte Advanced, "3rd Generation Partnership Project; Technical Specification Group Radio Access Network; Small Cell Enhancements for E-UTRA and E-UTRAN-Physical Layer Aspects (Release 12)", 3GPP TR 36.872 V12.1.0, (Dec. 2013), Dec. 20, 2013, 100 pgs.

\* cited by examiner

SYSTEM AND METHOD FOR TIMING ALIGNMENT OF LTE CELLS AND INTER-OPERATOR CO-EXISTENCE ON UNLICENSED SPECTRUM

CROSS-REFERENCE TO RELATED APPLICATION(S) AND CLAIM OF PRIORITY

The present application claims priority to U.S. Provisional Patent Application Ser. No. 61/987,312, filed May 1, 2014, entitled "METHODS FOR TIMING ALIGNMENT OF LTE CELLS ON UNLICENSED SPECTRUM"; U.S. Provisional Patent Application Ser. No. 62/105,504, filed Jan. 20, 2015, entitled "METHODS FOR TIMING ALIGNMENT OF LTE CELLS ON UNLICENSED SPECTRUM"; and U.S. Provisional Patent Application Ser. No. 62/105,519, filed Jan. 20, 2015, entitled "METHODS FOR INTER-OPERATOR CO-EXISTENCE FOR LTE ON UNLICENSED SPECTRUM". The content of the above-identified patent documents are incorporated herein by reference.

TECHNICAL FIELD

The present application relates generally to wireless communications systems and, more specifically, to cell discovery reference signal configuration methods.

BACKGROUND

A communication system includes a DownLink (DL) that conveys signals from transmission points such as Base Stations (BSs) or eNodeBs to User Equipments (UEs) and an UpLink (UL) that conveys signals from UEs to reception points such as eNodeBs. A UE, also commonly referred to as a terminal or a mobile station, may be fixed or mobile and may be a cellular phone, a personal computer device, and the like. An eNodeB, which is generally a fixed station, may also be referred to as an access point or other equivalent terminology. DL signals include data signals conveying information content, control signals conveying DL Control Information (DCI), and Reference Signals (RS), which are also known as pilot signals. An eNodeB transmits data information or DCI through respective Physical DL Shared CHannels (PDSCHs) or Physical DL Control CHannels (PDCCHs). Possible DCI formats used for downlink assignment include DCI format 1A, 1B, 1C, 1D, 2, 2A, 2B, 2C and 2D. A UE can be configured with a transmission mode that determines the downlink unicast reception method for the UE. For a given transmission mode, a UE can receive unicast downlink assignment using DCI format 1A and one of DCI format 1B, 1D, 2, 2A, 2B, 2C or 2D. An eNodeB transmits one or more of multiple types of RS including a UE-Common RS (CRS), a Channel State Information RS (CSI-RS), and a DeModulation RS (DMRS). A CRS is transmitted over a DL system BandWidth (BW) and can be used by UEs to demodulate data or control signals or to perform measurements. To reduce CRS overhead, an eNodeB may transmit a CSI-RS with a smaller density in the time and/or frequency domain than a CRS. For channel measurement, Non-Zero Power CSI-RS (NZP CSI-RS) resources can be used. For Interference Measurement Resources (IMRs), CSI Interference Measurement (CSI-IM) resources associated with a Zero Power CSI-RS (ZP CSI-RS) can be used. A UE can determine the CSI-RS transmission parameters through higher layer signaling from an eNodeB. DMRS is transmitted only in the BW of a respective PDSCH and a UE can use the DMRS to demodulate information in a PDSCH.

SUMMARY

In a first embodiment, wireless transmission point is provided. The wireless transmission point includes at least one antenna configured to communicate with a plurality of mobile terminals. The wireless transmission point also includes processing circuitry configured to adjust an ON-OFF cycle operation of the at least one antenna. The ON-OFF cycle operation includes an ON period during which the at least one antenna transmits data and control signals, and an OFF period in which one of: no signals are transmitted and only discovery reference signals are transmitted. The processing circuitry is also configured to detect data and control signals transmitted from at least one other transmission point and determine a start of an ON-OFF cycle operation of the at least one other transmission point. The processing circuitry is further configured to align the ON-OFF cycle operation of the at least one antenna with the ON-OFF cycle operation of the at least one other transmission point.

In a second embodiment, a mobile terminal is provided. The mobile terminal includes at least one antenna configured to communicate with at least one access point (AP) and processing circuitry. The processing circuitry is configured to send and receive data with the at least one AP. The processing circuitry is also configured to, in response to detecting a presence of at least one other transmission point, send a detection report to the at least one AP, the detection report configured to enable the at least one AP to align an ON-OFF cycle operation with the at least one other transmission point. The ON-OFF cycle operation includes an ON period during which the at least one AP transmits data and control signals, and an OFF period in which one of: no signals are transmitted and only discovery reference signals are transmitted.

In a third embodiment, a method is provided. The method includes receiving, from a first evolved NodeB (eNodeB) operated by a first operator a physical broadcast channel (PBCH) and a physical downlink shared channel (PDSCH). The PBCH carries a master information block (MIB), and the PDSCH carries a single system information block (SIB) identifying available unlicensed channel and including public land mobile network (PLMN) identities for networks operating using the unlicensed channel. The method also includes using, by a second eNodeB operated by a second operator, the MIB and SIB1 to identify that the first eNodeB is operated by the first operator. A transmission coverage of the first eNodeB partially overlaps with a transmission coverage of the second eNodeB.

Other technical features may be readily apparent to one skilled in the art from the following figures, descriptions, and claims. Definitions for other certain words and phrases are provided throughout this patent document. Those of ordinary skill in the art should understand that in many if not most instances, such definitions apply to prior as well as future uses of such defined words and phrases.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive,"

and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1A through 14, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communications device or system.

The following documents and standards descriptions are hereby incorporated into the present disclosure as if fully set forth herein: 3GPP TS 36.211 v11.2.0, "E-UTRA, Physical channels and modulation" (REF 1); 3GPP TS 36.212 v11.2.0, "E-UTRA, Multiplexing and Channel coding" (REF 2); 3GPP TS 36.213 v11.2.0, "E-UTRA, Physical Layer Procedures" (REF 3); 3GPP TR 36.872 V12.0.0, "Small cell enhancements for E-UTRA and E-UTRAN—Physical layer aspects" (REF 4); and 3GPP TS 36.133 v11.7.0, "E-UTRA Requirements for support of radio resource management" (REF 5). The contents of which are hereby incorporated by reference in their entirety.

Figure 1A:
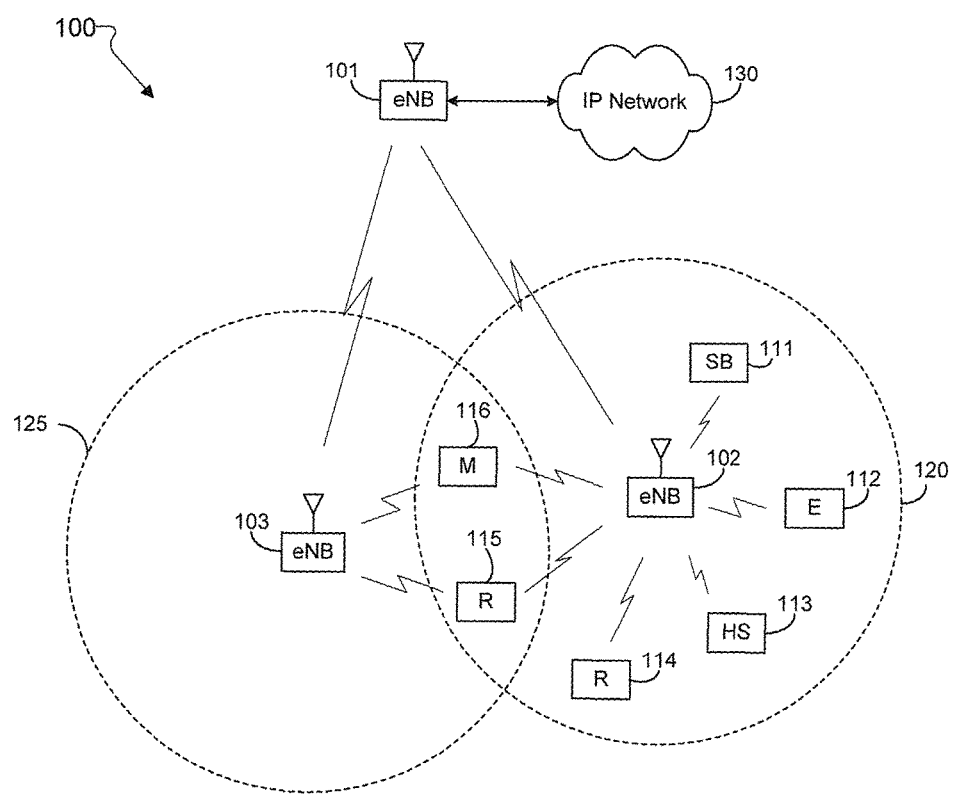
FIG. 1A illustrates an example wireless network according to this disclosure.

FIG. 1A illustrates an example wireless network 100 according to this disclosure. The embodiment of the wireless network 100 shown in FIG. 1A is for illustration only. Other embodiments of the wireless network 100 could be used without departing from the scope of this disclosure.

The wireless network 100 includes an eNodeB (eNB) 101, an eNB 102, and an eNB 103. The eNB 101 communicates with the eNB 102 and the eNB 103. The eNB 101 also communicates with at least one Internet Protocol (IP) network 130, such as the Internet, a proprietary IP network, or other data network.

Depending on the network type, other well-known terms may be used instead of "eNodeB" or "eNB," such as "base station" (BS) or "access point" (AP). For the sake of convenience, the terms "eNodeB" and "eNB" are used in this patent document to refer to network infrastructure components that provide wireless access to remote terminals. Also, depending on the network type; other well-known terms may be used instead of "user equipment" or "UE," such as "mobile station," "subscriber station," "remote terminal," "wireless terminal," "mobile terminal," or "user device." For the sake of convenience, the terms "user equipment" and "UE" are used in this patent document to refer to remote wireless equipment that wirelessly accesses an eNB, whether the UE is a mobile device (such as a mobile telephone or smartphone) or is normally considered a stationary device (such as a desktop computer or vending machine).

The eNB 102 provides wireless broadband access to the network 130 for a first plurality of user equipments (UEs) within a coverage area 120 of the eNB 102. The first plurality of UEs includes a UE 111, which may be located in a small business (SB); a UE 112, which may be located in an enterprise (E); a UE 113, which may be located in a Wi-Fi hotspot (HS); a UE 114, which may be located in a first residence (R); a UE 115, which may be located in a second residence (R); and a UE 116, which may be a mobile device (M) like a cell phone, a wireless laptop, a wireless PDA, or the like. The eNB 103 provides wireless broadband access to the network 130 for a second plurality of UEs within a coverage area 125 of the eNB 103. The second plurality of UEs includes the UE 115 and the UE 116. In some embodiments, one or more of the eNBs 101-103 may communicate with each other and with the UEs 111-116 using 5G, Long Term Evolution (LTE), Long Term Evolution-Advanced (LTE-A), Worldwide Interoperability for Microwave Access (WiMAX), or other advanced wireless communication techniques.

Dotted lines show the approximate extents of the coverage areas 120 and 125, which are shown as approximately circular for the purposes of illustration and explanation only. It should be clearly understood that the coverage areas associated with eNBs, such as the coverage areas 120 and 125, may have other shapes, including irregular shapes, depending upon the configuration of the eNBs and variations in the radio environment associated with natural and man-made obstructions.

As described in more detail below, one or more of eNB 101, eNB 102 or eNB 103 is configured to support timing alignment of LTE cells on an unlicensed spectrum for cell discovery. In addition, one or more of eNB 101, eNB 102 or eNB 103 is configured to support inter-operator co-existence for LTE on an unlicensed spectrum for cell discovery.

Although FIG. 1A illustrates one example of a wireless network 100, various changes may be made to FIG. 1A. For example, the wireless network 100 could include any number of eNBs and any number of UEs in any suitable arrangement. Also, the eNB 101 could communicate directly with any number of UEs and provide those UEs with wireless broadband access to the network 130. Similarly, each eNB 102-103 could communicate directly with the network 130 and provide UEs with direct wireless broadband access to the network 130. Further, one or more of the eNB 101, 102, or 103 could provide access to other or additional external networks, such as external telephone networks or other types of data networks.

Figure 1B:
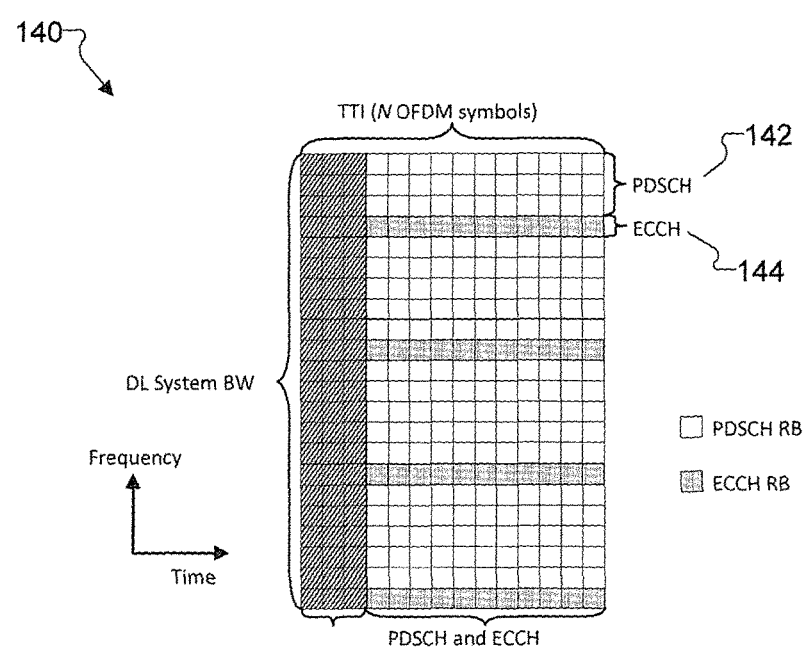
FIG. 1B illustrates a structure of a DL Transmission Time Interval (TTI) according to this disclosure.

FIG. 1B illustrates a structure of a DL Transmission Time Interval (TTI) according to this disclosure. The embodiment of the DL Transmission TTI 140 shown in FIG. 1b is for illustration only. Other embodiments could be used without departing from the scope of the present disclosure.

DL signaling uses Orthogonal Frequency Division Multiplexing (OFDM) and a DL TTI includes N=14 OFDM symbols in the time domain and K Resource Blocks (RBs) in the frequency domain. A first type of Control CHannels (CCHs) is transmitted in a first $N_1$ OFDM symbols 110 (including no transmission, $N_1$=0). A remaining $N-N_1$ OFDM symbols are used primarily for transmitting PDSCHs 142 and, in some RBs of a TTI, for transmitting a second type of CCHs (ECCHs) 144.

An eNB, such as the eNB 103, also transmits Primary Synchronization Signals (PSS) and Secondary Synchronization Signals (SSS), so that a UE, such as UE 116, can synchronize with the eNodeB and perform cell identification. There are 504 unique physical-layer cell identities. The physical-layer cell identities are grouped into 168 unique physical-layer cell-identity groups, each group containing three unique identities. The grouping is such that each physical-layer cell identity is part of one and only one physical-layer cell-identity group. A physical-layer cell identity $N_{ID}^{cell}=3N_{ID}^{(1)}+N_{ID}^{(2)}$ is thus uniquely defined by a number $N_{ID}^{(1)}$ in the range of 0 to 167, representing the physical-layer cell-identity group, and a number $N_{ID}^{(2)}$ in the range of 0 to 2, representing the physical-layer identity within the physical-layer cell-identity group. Detecting a PSS enables the UE 116 to determine the physical-layer identity as well as the slot timing of the cell transmitting the PSS. Detecting a SSS enables the UE 116 to determine the radio frame timing, the physical-layer cell identity, the cyclic prefix length as well as the cell uses Frequency Division Duplexing (FDD) or a Time Division Duplexing (TDD) scheme.

Figure 2A:
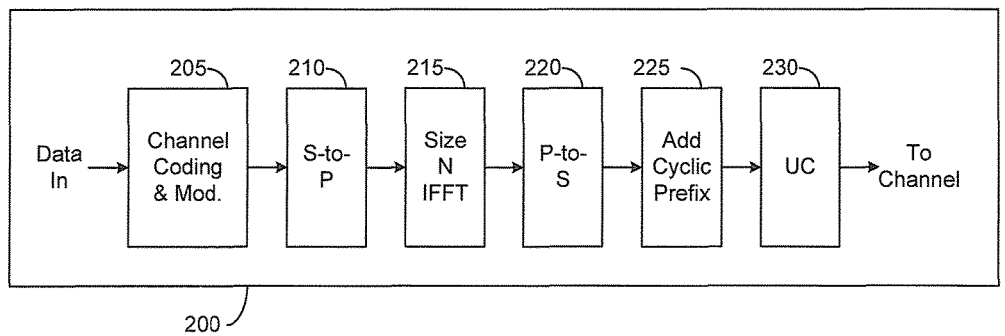
FIGS. 2A and 2B illustrate example wireless transmit and receive paths according to this disclosure.
Figure 2B:
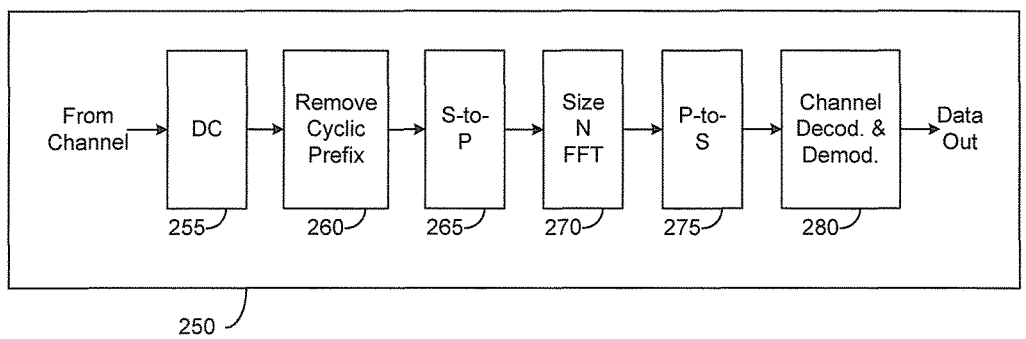

FIGS. 2A and 2B illustrate example wireless transmit and receive paths according to this disclosure. In the following description, a transmit path 200 may be described as being implemented in an eNB (such as eNB 102), while a receive path 250 may be described as being implemented in a UE (such as UE 116). However, it will be understood that the receive path 250 could be implemented in an eNB and that the transmit path 200 could be implemented in a UE. In certain embodiments, the transmit path 200 and receive path 250 are configured to support timing alignment of LTE cells on an unlicensed spectrum for cell discovery. In certain embodiments, the transmit path 200 and receive path 250 are configured to support inter-operator co-existence for LTE on an unlicensed spectrum for cell discovery.

The transmit path 200 includes a channel coding and modulation block 205, a serial-to-parallel (S-to-P) block 210, a size N Inverse Fast Fourier Transform (IFFT) block 215, a parallel-to-serial (P-to-S) block 220, an add cyclic prefix block 225, and an up-converter (UC) 230. The receive path 250 includes a down-converter (DC) 255, a remove cyclic prefix block 260, a serial-to-parallel (S-to-P) block 265, a size N Fast Fourier Transform (FFT) block 270, a parallel-to-serial (P-to-S) block 275, and a channel decoding and demodulation block 280.

In the transmit path 200, the channel coding and modulation block 205 receives a set of information bits, applies coding (such as a low-density parity check (LDPC) coding), and modulates the input bits (such as with Quadrature Phase Shift Keying (QPSK) or Quadrature Amplitude Modulation (QAM)) to generate a sequence of frequency-domain modulation symbols. The serial-to-parallel block 210 converts (such as de-multiplexes) the serial modulated symbols to parallel data in order to generate N parallel symbol streams, where N is the IFFT/FFT size used in the eNB 102 and the UE 116. The size N IFFT block 215 performs an IFFT operation on the N parallel symbol streams to generate time-domain output signals. The parallel-to-serial block 220 converts (such as multiplexes) the parallel time-domain output symbols from the size N IFFT block 215 in order to generate a serial time-domain signal. The add cyclic prefix block 225 inserts a cyclic prefix to the time-domain signal. The up-converter 230 modulates (such as up-converts) the output of the add cyclic prefix block 225 to an RF frequency for transmission via a wireless channel. The signal may also be filtered at baseband before conversion to the RF frequency.

A transmitted RF signal from the eNB 102 arrives at the UE 116 after passing through the wireless channel, and reverse operations to those at the eNB 102 are performed at the UE 116. The down-converter 255 down-converts the received signal to a baseband frequency, and the remove cyclic prefix block 260 removes the cyclic prefix to generate a serial time-domain baseband signal. The serial-to-parallel block 265 converts the time-domain baseband signal to parallel time domain signals. The size N FFT block 270 performs an FFT algorithm to generate N parallel frequency-domain signals. The parallel-to-serial block 275 converts the parallel frequency-domain signals to a sequence of modulated data symbols. The channel decoding and demodulation block 280 demodulates and decodes the modulated symbols to recover the original input data stream.

Each of the eNBs 101-103 may implement a transmit path 200 that is analogous to transmitting in the downlink to UEs 111-116 and may implement a receive path 250 that is analogous to receiving in the uplink from UEs 111-116. Similarly, each of UEs 111-116 may implement a transmit path 200 for transmitting in the uplink to eNBs 101-103 and may implement a receive path 250 for receiving in the downlink from eNBs 101-103.

Each of the components in FIGS. 2A and 2B can be implemented using only hardware or using a combination of hardware and software/firmware. As a particular example, at least some of the components in FIGS. 2A and 2B can be implemented in software, while other components can be implemented by configurable hardware or a mixture of software and configurable hardware. For instance, the FFT block 270 and the IFFT block 215 can be implemented as configurable software algorithms, where the value of size N can be modified according to the implementation.

Furthermore, although described as using FFT and IFFT, this is by way of illustration only and should not be construed to limit the scope of this disclosure. Other types of transforms, such as Discrete Fourier Transform (DFT) and Inverse Discrete Fourier Transform (IDFT) functions, could be used. It will be appreciated that the value of the variable N can be any integer number (such as 1, 2, 3, 4, or the like) for DFT and IDFT functions, while the value of the variable N can be any integer number that is a power of two (such as 1, 2, 4, 8, 16, or the like) for FFT and IFFT functions.

Although FIGS. 2A and 2B illustrate examples of wireless transmit and receive paths, various changes may be made to FIGS. 2A and 2B. For example, various components in FIGS. 2A and 2B could be combined, further subdivided, or omitted and additional components could be added according to particular needs. Also, FIGS. 2A and 2B are meant to illustrate examples of the types of transmit and receive paths that could be used in a wireless network. Any other suitable architectures could be used to support wireless communications in a wireless network.

Figure 3:
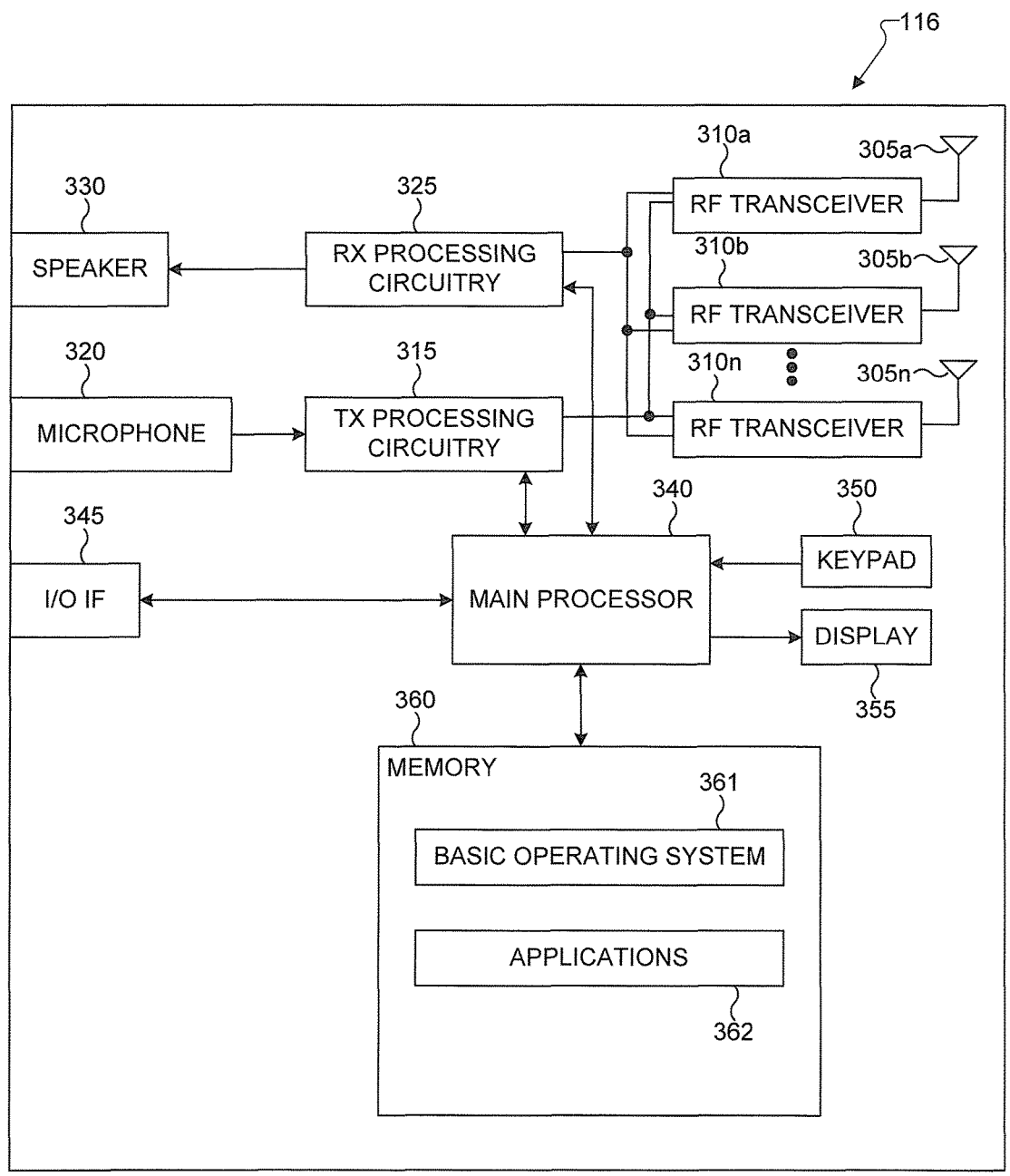
FIG. 3 illustrates an example user equipment according to this disclosure.

FIG. 3 illustrates an example UE 116 according to this disclosure. The embodiment of the UE 116 illustrated in FIG. 3 is for illustration only, and the UEs 111-115 of FIG. 1A could have the same or similar configuration. However, UEs come in a wide variety of configurations, and FIG. 3 does not limit the scope of this disclosure to any particular implementation of a UE.

The UE 116 includes multiple antennas 305a-305n, radio frequency (RF) transceivers 310a-310n, transmit (TX) processing circuitry 315, a microphone 320, and receive (RX) processing circuitry 325. The TX processing circuitry 315 and RX processing circuitry 325 are respectively coupled to each of the RF transceivers 310a-310n, for example, coupled to RF transceiver 310a, RF transceiver 210b through to a $N^{th}$ RF transceiver 310n, which are coupled respectively to antenna 305a, antenna 305b and an $N^{th}$ antenna 305n. In certain embodiments, the UE 116 includes a single antenna 305a and a single RF transceiver 310a. The UE 116 also includes a speaker 330, a main processor 340, an input/output (I/O) interface (IF) 345, a keypad 350, a display 355, and a memory 360. The memory 360 includes a basic operating system (OS) program 361 and one or more applications 362.

The RF transceivers 310a-310n receive, from respective antennas 305a-305n, an incoming RF signal transmitted by an eNB or AP of the network 100. In certain embodiments, each of the RF transceivers 310a-310n and respective antennas 305a-305n is configured for a particular frequency band or technological type. For example, a first RF transceiver 310a and antenna 305a can be configured to communicate via a near-field communication, such as BLUETOOTH®, while a second RF transceiver 310b and antenna 305b can be configured to communicate via a IEEE 802.11 communication, such as Wi-Fi, and another RF transceiver 310n and antenna 305n can be configured to communicate via cellular communication, such as 3G, 4G, 5G, LTE, LTE-A, or WiMAX. In certain embodiments, one or more of the RF transceivers 310a-310n and respective antennas 305a-305n is configured for a particular frequency band or same technological type. The RF transceivers 310a-310n down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the main processor 340 for further processing (such as for web browsing data).

The TX processing circuitry 315 receives analog or digital voice data from the microphone 320 or other outgoing baseband data (such as web data, e-mail, or interactive video game data) from the main processor 340. The TX processing circuitry 315 encodes, multiplexes, and/or digitizes the outgoing baseband data to generate a processed baseband or IE signal. The RE transceivers 310a-310n receive the outgoing processed baseband or IF signal from the TX processing circuitry 315 and up-converts the baseband or IF signal to an RF signal that is transmitted via one or more of the antennas 305a-305n.

The main processor 340 can include one or more processors or other processing devices and execute the basic OS program 361 stored in the memory 360 in order to control the overall operation of the UE 116. For example, the main processor 340 could control the reception of forward channel signals and the transmission of reverse channel signals by the RF transceivers 310a-310n, the RX processing circuitry 325, and the TX processing circuitry 315 in accordance with well-known principles. In some embodiments, the main processor 340 includes at least one microprocessor or microcontroller.

The main processor 340 is also capable of executing other processes and programs resident in the memory 360, such as operations for one or more of timing alignment of LTE cells on an unlicensed spectrum for cell discovery or interoperator co-existence for LTE on an unlicensed spectrum for cell discovery. The main processor 340 can move data into or out of the memory 360 as required by an executing process. In some embodiments, the main processor 340 is configured to execute the applications 362 based on the OS program 361 or in response to signals received from eNBs or an operator. The main processor 340 is also coupled to the I/O interface 345, which provides the UE 116 with the ability to connect to other devices such as laptop computers and handheld computers. The I/O interface 345 is the communication path between these accessories and the main controller 340.

The main processor 340 is also coupled to the keypad 350 and the display unit 355. The user of the UE 116 can use the keypad 350 to enter data into the UE 116. The display 355 can be a liquid crystal display or other display capable of rendering text or at least limited graphics, such as from web sites, or a combination thereof.

The memory 360 is coupled to the main processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the main processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4:
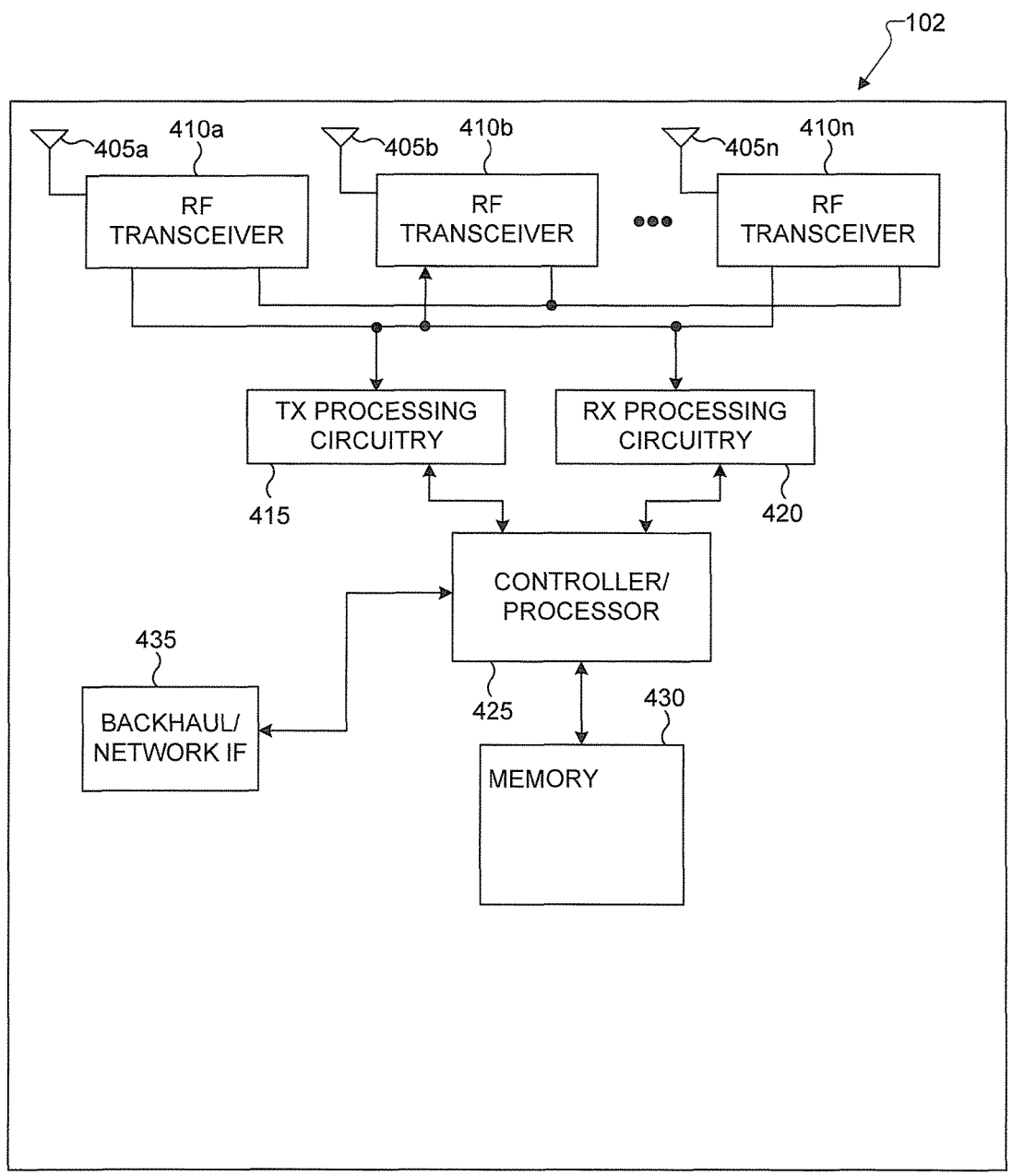
FIG. 4 illustrates an example access point according to this disclosure.

FIG. 4 illustrates an example access point according to this disclosure. The embodiment of the access point (AP) shown in FIG. 4 is for illustration only. An LTE cell, LTE-U cell, or one or more of the eNBs of FIG. 1A could have the same or similar configuration. However, APs and eNBs come in a wide variety of configurations, and FIG. 4 does not limit the scope of this disclosure to any particular implementation of an eNB.

The AP 400 includes multiple antennas 405a-405n, multiple RF transceivers 410a-410n, transmit (TX) processing circuitry 415, and receive (RX) processing circuitry 420. The TX processing circuitry 415 and RX processing circuitry 420 are respectively coupled to each of the RF transceivers 410a-410n, for example, coupled to RF transceiver 410a, RF transceiver 410b through to a $N^{th}$ RF transceiver 410n, which are coupled respectively to antenna 405a, antenna 405b and an $N^{th}$ antenna 405n. In certain embodiments, the AP 400 includes a single antenna 405a and a single RF transceiver 410a. The AP 400 also includes a controller/processor 425, a memory 430, and a backhaul or network interface 435.

The RF transceivers 410a-410n receive, from the antennas 405a-405n, incoming RF signals, such as signals transmitted by UEs or other eNBs. The RF transceivers 410a-410n down-convert the incoming RF signals to generate IF or baseband signals. The IF or baseband signals are sent to the RX processing circuitry 420, which generates processed baseband signals by filtering, decoding, and/or digitizing the baseband or IF signals. The RX processing circuitry 420 transmits the processed baseband signals to the controller/processor 425 for further processing.

The TX processing circuitry 415 receives analog or digital data (such as voice data, web data, e-mail, or interactive video game data) from the controller/processor 425. The TX processing circuitry 415 encodes, multiplexes, and/or digitizes the outgoing baseband data to generate processed baseband or IF signals. The RF transceivers 410a-410n receive the outgoing processed baseband or IF signals from the TX processing circuitry 415 and up-converts the baseband or IF signals to RF signals that are transmitted via the antennas 405a-405n.

The controller/processor 425 can include one or more processors or other processing devices that control the overall operation of the AP 400. For example, the controller/processor 425 could control the reception of forward channel signals and the transmission of reverse channel signals by the RF transceivers 410a-410n, the RX processing circuitry 420, and the TX processing circuitry 415 in accordance with well-known principles. The controller/processor 425 could support additional functions as well, such as more advanced wireless communication functions. For instance, the controller/processor 425 could support beam forming or directional routing operations in which outgoing signals from multiple antennas 405a-405n are weighted differently to effectively steer the outgoing signals in a desired direction. Any of a wide variety of other functions could be supported in the AP 400 by the controller/processor 425. In some embodiments, the controller/processor 425 includes at least one microprocessor or microcontroller.

The controller/processor 425 is also capable of executing programs and other processes resident in the memory 430, such as a basic OS. The controller/processor 425 can move data into or out of the memory 430 as required by an executing process.

The controller/processor 425 is also coupled to the backhaul or network interface 435. The backhaul or network interface 435 allows the AP 400 to communicate with other devices or systems over a backhaul connection or over a network. The interface 435 could support communications over any suitable wired or wireless connection(s). For example, when the AP 400 is implemented as part of a cellular communication system (such as one supporting 5G, LTE, or LTE-A), the interface 435 could allow the AP 400 to communicate with other eNBs over a wired or wireless backhaul connection. When the AP 400 is implemented as an access point, the interface 435 could allow the AP 400 to communicate over a wired or wireless local area network or over a wired or wireless connection to a larger network (such as the Internet). The interface 435 includes any suitable structure supporting communications over a wired or wireless connection, such as an Ethernet or RF transceiver.

The memory 430 is coupled to the controller/processor 425. Part of the memory 430 could include a RAM, and another part of the memory 430 could include a Flash memory or other ROM.

As described in more detail below, the transmit and receive paths of the AP 400 (implemented using the RF transceivers 410a-410n, TX processing circuitry 415, or RX processing circuitry 420, or a combination thereof) support operations for one or more of timing alignment of LTE cells on an unlicensed spectrum for cell discovery or inter-operator co-existence for LTE on an unlicensed spectrum for cell discovery.

Although FIG. 4 illustrates one example of an AP 400, various changes may be made to FIG. 4. For example, the AP 400 could include any number of each component shown in FIG. 4. As a particular example, an access point could include a number of interfaces 435, and the controller/processor 425 could support routing functions to route data between different network addresses. As another particular example, while shown as including a single instance of TX processing circuitry 415 and a single instance of RX processing circuitry 420, the AP 400 could include multiple instances of each (such as one per RF transceiver).

Figure 5:
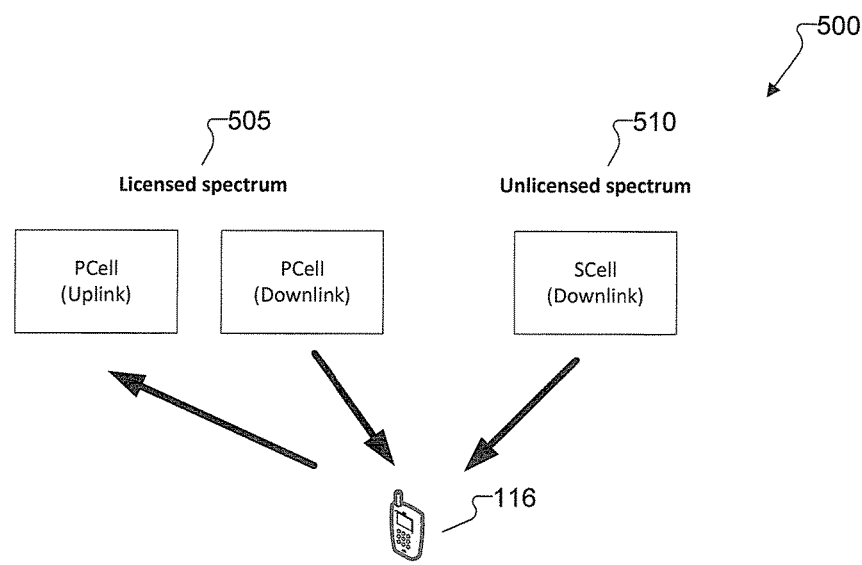
FIG. 5 illustrates carrier aggregation of a carrier on licensed spectrum and a carrier on an unlicensed spectrum according to this disclosure.

FIG. 5 illustrates carrier aggregation of a carrier on licensed spectrum and a carrier on an unlicensed spectrum according to this disclosure. The example of the carrier aggregation 500 shown in FIG. 5 is for illustration only. Other examples could be illustrated without departing from the scope of the present disclosure.

It is possible to deploy LTE radio access technology (RAT) on an unlicensed frequency spectrum. One example is known as LTE-Unlicensed or LTE-U. Another example is known as Licensed Assisted Access (LAA). LTE-U is used as example in this disclosure for ease of exposition. Other examples of LTE on unlicensed frequency spectrum can be used without departing from the scope of the present disclosure. A possible deployment scenario for LTE-U is to deploy an LTE-U carrier as a part of carrier aggregation, where an LTE-U carrier is aggregated with another carrier on a licensed spectrum, as shown in the example illustrated in FIG. 2. In a typical arrangement, the carrier on the licensed spectrum 505 is assigned as the Primary Cell (PCell) for uplink and PCell for downlink. In the example shown in FIG. 2, a PCell for uplink and a PCell for downlink are illustrated; however, a single PCell can be utilized. The carrier on the unlicensed spectrum 510 is assigned as the Secondary Cell (SCell) for UE 116. In the example shown in FIG. 2, the LTE-U cell, that is the cell on the unlicensed spectrum 510, includes a downlink carrier without an uplink carrier.

Since other RATs may be operating on the same unlicensed spectrum 510 as the LTE-U carrier, there is a need to enable co-existence of the other RAT with LTE-U on an unlicensed frequency spectrum. One possible method is to create a Time-Division-Multiplexing (TDM) transmission pattern between a LTE-U transmitter and transmitters of the other RATs, such as a Wi-Fi Access Point.

Figure 6:
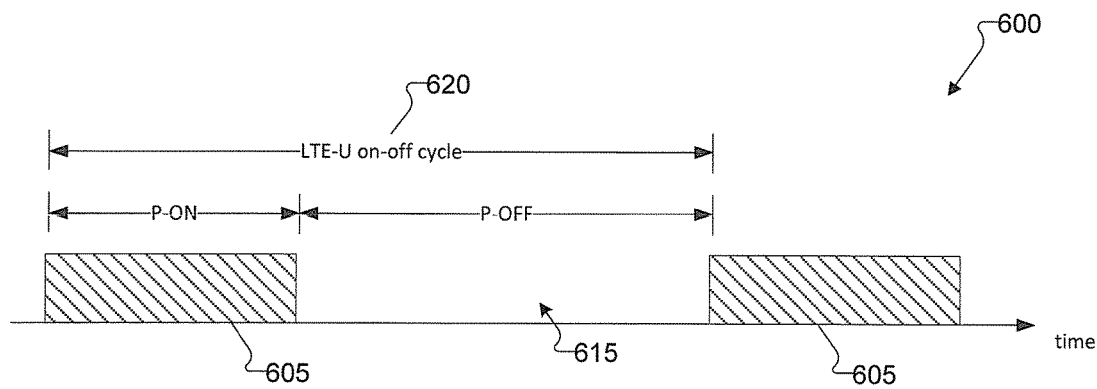
FIG. 6 illustrates example of a TDM transmission pattern for a LTE-U downlink carrier according to this disclosure.

FIG. 6 illustrates example of a TDM transmission pattern for a LTE-U downlink carrier according to this disclosure. The example of the TDM transmission pattern 600 for a LTE-U downlink carrier shown in FIG. 6 is for illustration only. Other examples could be illustrated without departing from the scope of the present disclosure.

The LTE-U carrier is ON 605 for a duration P-ON and is OFF 615 for a duration P-OFF. When the LTE-U carrier is ON 605, LTE signals are transmitted including at least one of: PSS, SSS, CRS, DMRS, PDSCH, PDCCH, EPDCCH or CSI-RS; whereas when the LTE-U carrier if OFF 615, the LTE-U cell does not transmit any signals, with a possible exception of a discovery reference signal with a relatively long transmission periodicity. However, for simplicity it is assumed hereafter that nothing is transmitted by the LTE-U cell if it is OFF 615. An LTE-U on-off cycle 620 can be defined to be P-ON+P-OFF. The duration of the LTE-U on-off cycle 620 can be fixed or semi-statically configured. The duration of LTE-U on-off cycle 620 can be of tens or hundreds of milliseconds (ms). The length, e.g., duration, for P-ON can be adjusted or adapted by a scheduler of the LTE-U according to the buffer status or traffic pattern at the LTE-U carrier and a co-existence metric requirement or target. Wi-Fi APs, or other RAT transmitters, can utilize the P-OFF period for transmissions since the P-OFF period is free from LTE-U interference. The measurement for the co-existence metric can be performed by the LTE-U cell during the off period of the LTE-U carrier to estimate the radio activity level of the spectrum. The adaptation of P-ON and P-OFF can be performed per LTE-U on-off cycle 620 or per multiple LTE-U on-off cycles 620. Signaling of ON 605 or OFF 615 of LTE-U cell to UE 116 can be done using SCell MAC activation and deactivation command. SCell MAC activation command can be sent via another serving cell such as the PCell. SCell MAC deactivation command can be sent from any serving cell, including the LTE-U cell. When an SCell is deactivated, UE 116 does not receive data on the SCell.

When multiple LTE-U carriers use the same frequency, there is benefit in terms of throughput performance of Wi-Fi and other RATs providing the LTE-U carrier timings are synchronized. That is, when using the same frequency, performance of Wi-Fi and other RATs is enhanced with system radio frame numbers or radio frames or sub-frames of LTE-U carriers are synchronized.

Figure 7:
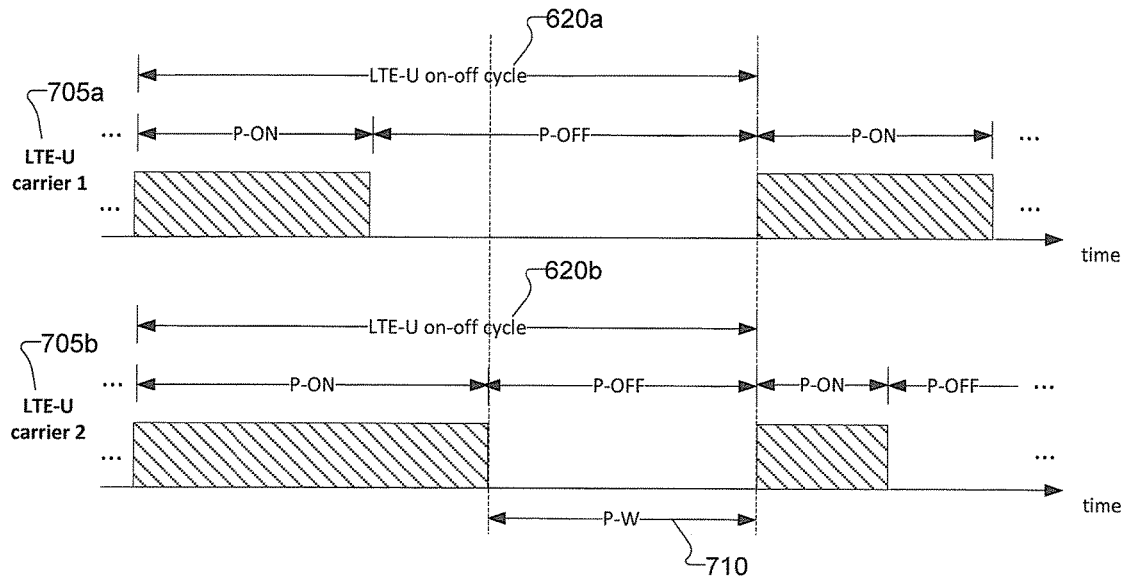
FIG. 7 illustrates an example of the TDM transmission patterns of two LTE-U downlink carriers that are synchronized according to this disclosure.

FIG. 7 illustrates an example of the TDM transmission patterns of two LTE-U downlink carriers that are synchronized according to this disclosure. The example of the TDM transmission patterns for a LTE-U downlink carrier shown in FIG. 7 is for illustration only. Other examples could be illustrated without departing from the scope of the present disclosure.

In the example shown in FIG. 7, a first LTE-U carrier 705a and a second LTE-U carrier 705b are on a same carrier frequency. The on-off cycle 620a for the first LTE-U carrier 705a is synchronized with the on-off cycle 620b for the second LTE-U carrier 705b. Wi-Fi and other RATs are able to operate free from LTE-U interference in time period P-W 710.

Figure 8:
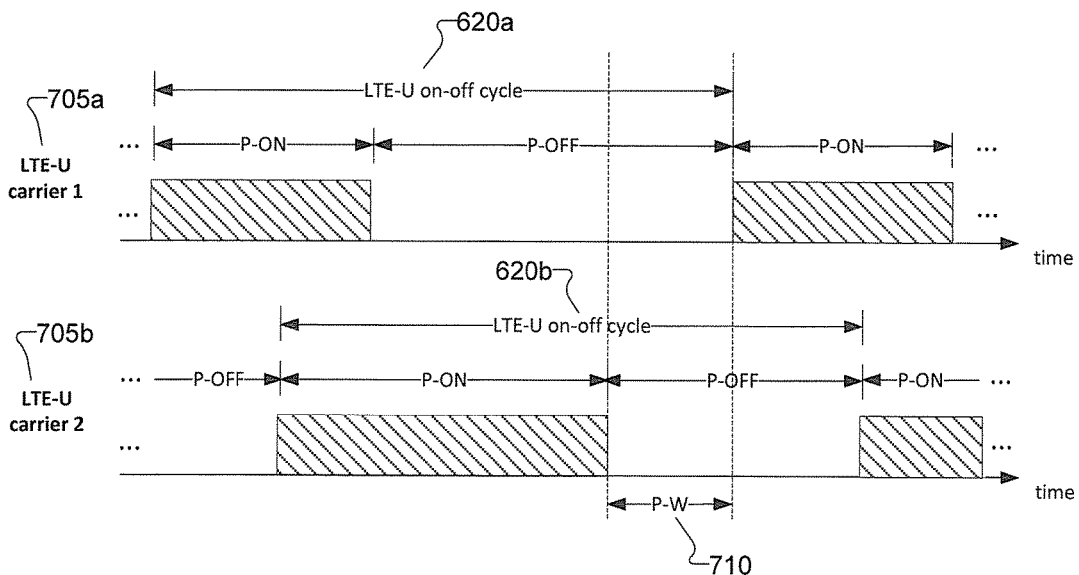
FIG. 8 illustrates an example of the TDM transmission patterns of two LTE-U downlink carriers that are not synchronized according to this disclosure.

FIG. 8 illustrates an example of the TDM transmission patterns of two LTE-U downlink carriers that are not synchronized according to this disclosure. The example of the TDM transmission patterns for a LTE-U downlink carrier shown in FIG. 7 is for illustration only. Other examples could be illustrated without departing from the scope of the present disclosure.

In the example shown in FIG. 8, the LTE-U carrier 705a and the second LTE-U carrier 705b are on a same carrier frequency. Since the timing of the two LTE-U carriers is not synchronized, the time period P-W 710 that is free from LTE-U interference is significantly reduced, as compared to the case when the LTE-U carriers are synchronized.

Alternatively, different LTE-U carriers can be controlled by different eNBs, which may belong to different operators. It can be costly in terms of operation and maintenance to ensure radio frame synchronization, or sub-frame synchronization among LTE-U carriers. In addition, synchronization of LTE-U carriers that act as SCells would also mean that the corresponding PCells also need to be synchronized. To address these deficiencies, embodiments of the present disclosure illustrate an efficient procedure to achieve LTE-U on-off cycle alignment without requiring system radio frame numbers synchronization or radio frame synchronization or sub-frame synchronization among LTE-U carriers.

Figure 9:
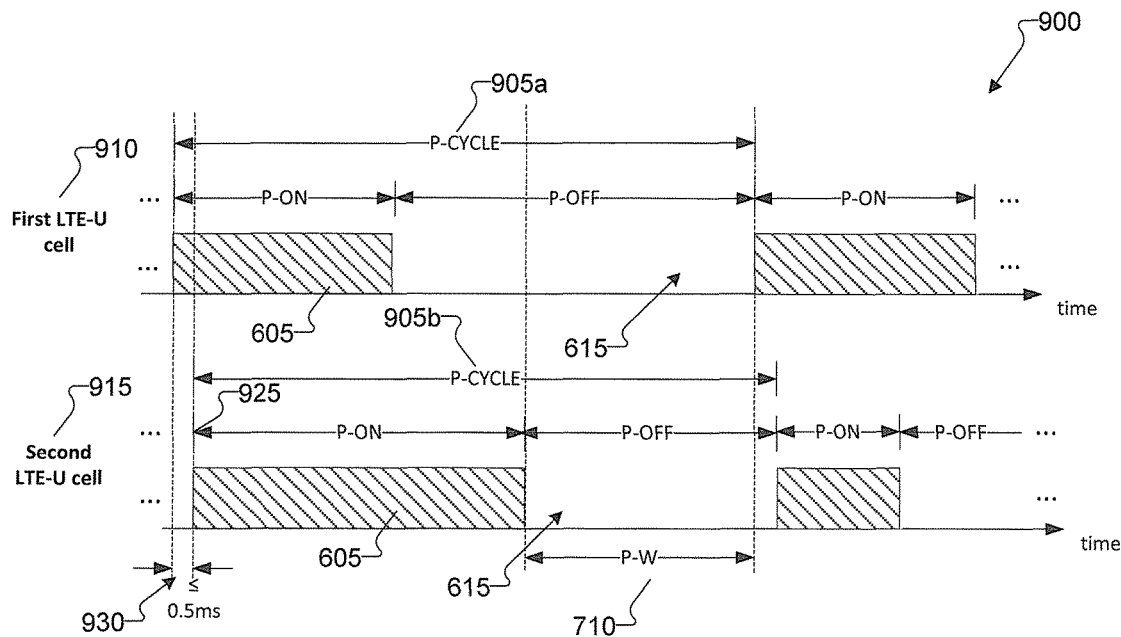
FIG. 9 illustrates an LTE-U on-off cycle alignment according to this disclosure.

FIG. 9 illustrates an LTE-U on-off cycle alignment according to this disclosure. The embodiment of the LTE-U on-off cycle alignment 900 shown in FIG. 9 is for illustration only. Other embodiments could be used without departing from the scope of the present disclosure.

In certain embodiments, (Embodiment 1) one or more of the components in FIG. 1A, such as eNB 102 or UE 116, are configured to perform an LTE-U on-off cycle alignment 900 procedure. An LTE-U cell can be configured the same as, or similar to, the AP 400 illustrated in FIG. 4.

In a first method, a LTE-U on-off cycle duration is either predetermined, or configured and coordinated, such as over an X2 interface or via a central coordinating node, among eNBs controlling LTE-U carriers. In other words, all LTE-U carriers use the same LTE-U on-off cycle duration, denoted as P-CYCLE 905. The LTE-U on-off cycle configured by each cell may also be uncoordinated, where the duration of duty cycle, the start of duty cycle, the end of duty cycle, or a combination thereof, are configured independently for each cell or eNB, and may not be communicated, such as over X2 interface among cells or eNBs. The start of an on-off cycle is marked by downlink transmission in one or multiple sub-frames immediately after an off period. In one example, eNB 102 always schedules transmission of downlink data from the start of an on-off cycle. In another example, eNB 102 always transmits at least the CRS in the first subframe of the on-off cycle.

In a first method for on-off cycle alignment procedure (Method 1), when a first LTE-U cell 910 comes on-line on a frequency, the first LTE-U cell 910 is required to detect the presence of a second LTE-U cell 915 or more cells within its coverage on the same frequency. The first LTE-U cell 910 is also required to detect the start of the on-off cycle of the second LTE-U cell 915 detected. The first LTE-U cell 910 is able to detect the second LTE-U cell 915, and other cells, using the following procedure:

Step 1: the first LTE-U cell 910 detects any existing LTE-U signals, such as by detecting PSS and the SSS transmitted by any existing LTE-U cells. PSS and SSS are transmitted during the on period of LTE-U cells. This step determines the presence of any LTE-U cell on a given frequency.

Step 2: when the second LTE-U cell 915 is detected, the first LTE-U cell 910 determines the second LTE-U cell's start 925 of LTE on-off cycle (P-CYCLE 905*b*) by detecting a transition of OFF 615 period to ON 605 period. The signal that indicates the start of on period can be CRS in the first sub-frame of the ON 605 period. The first LTE-U cell 910 sets $t_s$ 930 to be the detected start time of the ON 605 period of the second LTE-U cell 915. When no cell, such as the second LTE-U cell 915, is detected, the first LTE-U cell 910 can choose $t_s$ 930 on its own.

Step 3: the first LTE-U cell 910 sets the starting sub-frame of its own LTE on-off cycle (P-CYCLE 905*a*) to be $$\text{sub-frame } k' = \min_k \{\text{abs}(s(k) - t_s)\}, \quad (1)$$

where s(k) is the start time of sub-frame k. The start times of the periodic on-off cycle (P-CYCLE 905*a*) of the first LTE-U cell 910 is determined to be s(k')+n. P-CYCLE, where n=0, 1, 2, 3, . . . .

The above procedure does not require the first LTE-U cell 910 and the second LTE-U cell 915 to be synchronized beforehand at a system frame number (SFN), radio frame or sub-frame level, that is, the two cells can remain asynchronous. As such, there can be a timing offset, $t_s$ 930, of up to ±0.5 ms between the on-off cycles (P-CYCLE 905) of the first LTE-U cell 910 and the second LTE-U cell 915. That is, the timing offset, $t_s$ 930 between P-CYCLE 905*a* and P-CYCLE 905*b* can be up to ±0.5 ms.

The LTE-U on-off cycle alignment 900 procedure can be repeated from time to time to compensate for any possible timing drift between the LTE-U cells. The procedure may not be needed all the time and, in certain embodiments, is only be triggered when a specified condition is satisfied, such as when the wireless channel is congested with high level of activities from non LTE-U wireless systems, such as Wi-Fi. In certain embodiments, the LTE-U on-off cycle alignment 900 procedure is triggered by a central coordinating node such as a co-existence manager module that coordinates co-existence among different radio access systems.

Although two cells are illustrated as example, this embodiment can be extended in a straightforward manner to cases in which there are more than two LTE-U cells. For example, the first LTE-U cell 910 can set the starting sub-frame of its on-off cycle to be $$\text{sub-frame } k' = \min_k \{\text{abs}(s(k) - E_m(t_s^m))\}, \quad (2)$$

where $t_s^m$ is the detected start time of the on period of the LTE-U cell m, $E_m(t_s^m)$ denotes the mean of $t_s^m$ over all LTE-U cells detected, s(k) is the start time of sub-frame k. The start times of the periodic on-off cycle of the first LTE-U cell is then determined to be s(k')+n. P-CYCLE, where n=0, 1, 2, 3, . . . .

In another example, eNB 102 may not always transmit at the start of an on-off cycle, but may transmit at any time or at any sub-frame within the on-off cycle. Furthermore, the start of transmission time within an on-off cycle can change over time, depending upon a decision by the scheduler, such that the start of transmission time may be perceived as random by another eNB, such as eNB 101 or eNB 103. For eNBs that operate transmissions on unlicensed spectrum, it can still be beneficial for the eNBs to overlap or partially overlap their transmissions if the inter-cell interference is acceptable and if a common off period is needed to allow another wireless system, such as Wi-Fi operating in the neighborhood, the opportunity to access the wireless channel. This can be accomplished using the following procedure by a first LTE-U cell 910, that is initially off for a carrier or channel:

Step 1: The first LTE-U cell 910 detects any existing LTE-U signals on a channel, such as by detecting PSS and the SSS transmitted by any existing LTE-U cells on the channel. PSS and SSS are transmitted during the ON 605 period of LTE-U cells. This step determines the presence of any LTE-U cell on a given frequency.

Step 2: If a second LTE-U cell 915 is detected, the first LTE-U cell 910 detects a transition by the second LTE-U cell 915 from an OFF 615 period to ON 605 period on the channel. The signal that indicates the start of ON 60 period can be a CRS in the first sub-frame of the ON 605 period. If the transition by the second LTE-U cell 915 from the OFF 615 period to the ON 605 period is detected, the first LTE-U cell 910 proceeds to Step 3; otherwise the first LTE-U cell 910 remains in an OFF 615 period for a time period. If there is data or signal to transmit for the first LTE-U cell 910 and the second LTE-U cell 915 is not detected to transmit for more than a time period, the first LTE-U cell 910 is allowed to transmit. If no second LTE-U cell 915 is detected, the first LTE-U cell 910 can choose to start transmission on its own and the procedure ends.

Step 3: The first LTE-U cell schedules or transmits signals on the channel upon detection of the transition by the second LTE-U cell 915 from the OFF 615 period to the ON 605 period. There can be delay of multiple sub-frames or milliseconds between the time when the off-to-on transition of the second LTE-U cell 915 is the detected and the time the first LTE-U cell 910 starts transmission.

Instead of on-off cycle alignment, as in the LTE-U on-off cycle alignment 900 procedure, the above procedure attempts to achieve at least partial resource reuse of at least one resource, such as overlapping frequency and time transmissions, among LTE-U cells. A variation of the procedure above ensures that the first LTE-U cell 910 allows at least a certain period of the second LTE-U cell 915 transmission without interference from the first LTE-U cell 910, which can be estimated from the measurement of the duty cycle or transmission pattern of the second LTE-U cell 915 by the first LTE-U cell 910. That is, when the first LTE-U cell 910 determines that, on average, the second LTE-U cell 915 transmits X milliseconds for every Y milliseconds, that is, the duty cycle is estimated to be X/Y, upon detection of the off-to-on transition of the second LTE-U cell 915, the first LTE-U cell 910 can transmit at least after αX ms from the off-to-on transition of the second LTE-U cell 915. For example, if α=0.5, the first LTE-U cell 910 can transmit at least after 0.5× milliseconds from the off-to-on transition of the second LTE-U cell 915.

In addition the offset for the start of the ON duration n can be selected subject to constraints of the desired P-ON duration of a given cell and the maximum P-ON duration P-ON$_{max}$ and minimum off duration P-OFF$_{min}$ aggregated across one or more cells. For example, if the desired percentage of P-OFF for all LTE-U cells, to provide coexistence with one or more Wi-Fi nodes, is at least 33% and the total on-off duration P-CYCLE=60 ms, P-OFF$_{min}$=20 ms and P-ON$_{max}$≤40 ms. If P-ON of the first LTE-U cell 910 node LTE-U1=30 ms starting at the beginning of the P-CYCLE 905*a* and the P-ON of the second LTE-U cell 915 node LTE-U2=30 ms, in order to meet the constraints of P-OFF$_{min}$ and P-OFF$_{max}$, the value of n selected by the second LTE-U cell 915 must satisfy n≤n$_{max}$=10. Also, in order to achieve only partial alignment, a minimum value of n may be set, such as n={$n_{min}, \ldots, n_{max}$}.

In a second method (Method 2) for the LTE-U on-off cycle alignment 900 procedure, when the first LTE-U cell 910 proceeds to detect the start of the on-off cycle (P-CYCLE 905b) of the second LTE-U cell 915 or more neighboring LTE-U cells, the first LTE-U cell 910 may not be able to detect the second LTE-U cell 915 if the first LTE-U cell 910 is out of the transmission range of the second LTE-U cell 915 but the UEs served by the first LTE-U cell 910 are within the transmission range of the second LTE-U cell 915. This so-called "hidden node problem" can result in undesired inefficient operation due to cycle misalignment. In particular, a Wi-Fi AP that is within an overlapping coverage region of both the first LTE-U cell 910 and the second LTE-U cell 915 can be deprived of channel access.

Figure 10:
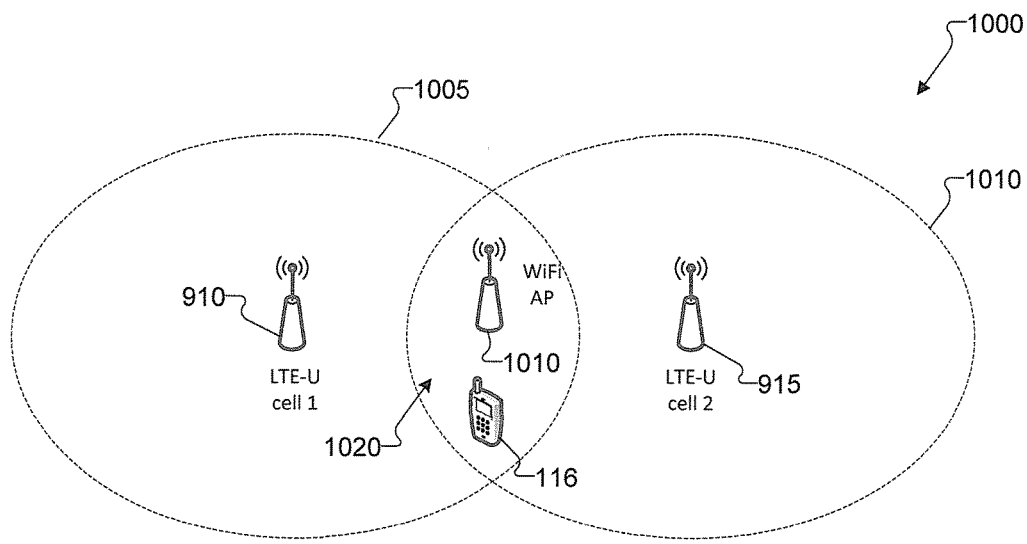
FIG. 10 illustrates a hidden node scenario according to this disclosure.

FIG. 10 illustrates a hidden node problem according to this disclosure. The embodiment of the network 1000 shown in FIG. 10 is for illustration only. Other embodiments could be used without departing from the scope of the present disclosure.

The first LTE-U cell 910 has a transmission coverage 1005 and the second LTE-U cell 915 has a transmission coverage 1010. Each LTE-U cell is out of coverage of the other LTE-U cell but a Wi-Fi AP 1015 and a UE 116 are within the overlapping 1020 coverage areas of both LTE-U cells. The Wi-Fi AP 1015 can be configured the same as, or similar to, the AP 400 shown in FIG. 4.

Alignment of the on-off cycle of the first LTE-U cell 910 and the second LTE-U cell 915 can still be accomplished using the following procedure by the first LTE-U cell 910 and at least one UE 116 connected with the first LTE-U cell 910 as follows:

Step 1: the UE 116 connected with the first LTE-U cell 910 detects any existing LTE-U signals by detecting PSS and the SSS transmitted by any existing LTE-U cells. PSS and SSS are transmitted during the on period of LTE-U cells. This step determines the presence of any LTE-U cell on a given frequency.

Step 2: when a second LTE-U cell 915 is detected, UE 116 connected with the first LTE-U cell 910 determines the start of on-off cycle of the second LTE-U cell 915 by detecting a transition from the OFF 615 period to the ON 605 period. The signal that indicates the start of ON 605 period can be CRS in the first sub-frame of the ON 605 period.

Step 3: UE 116 connected with the first LTE-U cell 910 reports information regarding the period of the second LTE-U cell 915 to the first LTE-U cell 910 such as by higher-layer signaling or layer-1 signaling. In certain embodiments, the cycle information is contained in a periodic or aperiodic measurement report or a new report format for on/off cycle information. One or more of the following information may be included by UE 116:

The start time of the on period of the second LTE-U: $t_s$ 930;

The detected on-off period duration;

Cell ID, such as PCID; and

RSRP measurement of the second LTE-U cell 915.

Step 4: The first LTE-U cell 910 sets the detected start time of the ON 605 period of the second LTE-U cell 915 to be $t_s$ 930.

Step 5: The first LTE-U cell 910 sets the starting sub-frame of its own on-off cycle to be:

$$\text{sub-frame } k' = \min_k\{abs(s(k) - t_s)\}, \quad (3)$$

where s(k) is the start time of sub-frame k. The start times of the periodic on-off cycle of the first LTE-U cell 910 is determined to be s(k')+n. P-CYCLE, where n=0, 1, 2, 3, . . . .

Additionally, in certain embodiments, UE 116 is configured with an on/off cycle reporting configuration. The on/off cycle reporting configuration can include one or more of the following: a set of cell IDs for monitoring, time/frequency resources for monitoring neighboring cells on/off cycle, and a RSRP threshold for triggering reporting.

Method 2 can also be performed by UE 116 before the UE 116 is configured with the first LTE-U cell 910. For example, UE 116 can be configured by its PCell on a licensed spectrum to perform the above procedure on a given frequency before UE 116 is configured with the first LTE-U cell 910 as an SCell.

In a third method (Method 3), the LTE-U on-off cycle alignment 900 or transmission alignment procedure can be performed using a centralized coordinating node, which can be referred to as a co-existence manager module. An example procedure is given below.

Step 0: the co-existence manager module requests LTE-U eNBs or cells, over the backhaul, to send their respective on-off transmission configuration information such as on-off cycle duration and duty cycle.

Step 1: upon receiving requests from the co-existence manager module, LTE-U cells/eNBs send their respective configuration information such as on-off cycle duration and duty cycle to the co-existence manager module over the backhaul. The configuration information can represent desired configuration rather than the configuration that is in effect currently.

Step 2: Based on the information received, the co-existence manager determines an on-off transmission configuration such as on-off cycle duration (P-CYCLE 905), duty cycle, maximum on period over P-CYCLE 905, and the approximate transmission start time $t_s$ for all LTE-U eNBs or cells. The co-existence manager module then sends the resulting configuration over the backhaul to all LTE-U cells.

Step 3: Upon receiving the configuration information from the co-existence manager, the LTE-U cell sets the starting sub-frame of its own on-off cycle to be:

$$\text{sub-frame } k' = \min_k\{abs(s(k) - t_s)\}, \quad (4)$$

where s(k) is the start time of sub-frame k. The start times of the periodic on-off cycle of the first LTE-U cell is determined to be s(k')+n. P-CYCLE, where n=0, 1, 2, 3, . . . .

Figure 11:
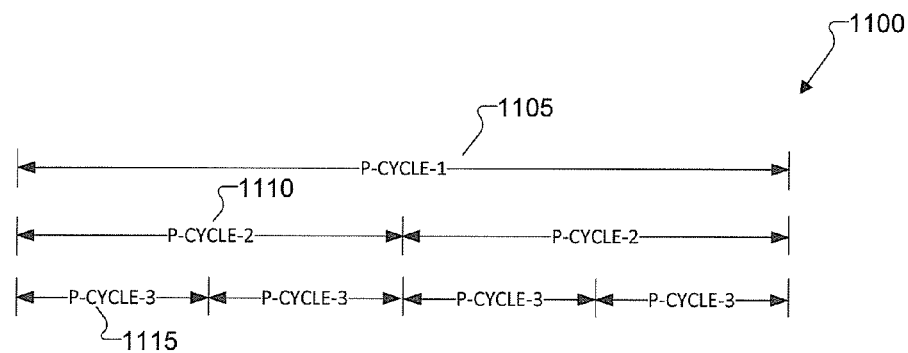
FIG. 11 illustrates a timing relationship among the different P-CYCLEs according to this disclosure.

FIG. 11 illustrates a timing relationship among the different P-CYCLEs according to this disclosure. The timing relationship 1100 shown in FIG. 11 is for illustration only. Other examples could be used without departing from the scope of the present disclosure.

Certain embodiments (Embodiment 2) provide for Nested LTE-U on-off cycles as follows:

It is also possible to define multiple LTE-U on-off cycle durations P-CYCLE-1, P-CYCLE-2, P-CYCLE-3, P-CYCLE-N. An LTE-U cell can choose a P-CYCLE that is more appropriate for the type of traffic served by the cell. For example, a shorter P-CYCLE is more suitable for service that requires shorter latency.

To maximize alignment of LTE-U cells' on periods while also allowing the flexibility for an LTE-U cell to choose a desired P-CYCLE, the P-CYCLEs can be defined such that a larger P-CYCLE is always an integer multiple of a shorter P-CYCLE.

Referring to FIG. 11, three possible P-CYCLEs, namely P-CYCLE-1 1105, P-CYCLE-2 1110 and P-CYCLE-3 1115 are shown. P-CYCLE-1 1105 is two times P-CYCLE-2 1110, which in turn is two times P-CYCLE-3 1115.

The on-off cycle alignment procedure as described in Embodiment 1, Method 1 can also be applied when there are multiple possible on-off cycle durations, as follows:

Step 0: The first LTE-U cell 910 chooses a P-CYCLE-x.

Step 1: The first LTE-U cell 910 detects any existing LTE-U signals by detecting PSS and the SSS transmitted by any existing LTE-U cells. PSS and SSS are transmitted during the ON 605 period of LTE-U cells. This step determines the presence of any LTE-U cell on a given frequency.

Step 2: If a second LTE-U cell 915 is detected, the first LTE-U cell 910 determines the start of on-off cycle of the second LTE-U cell 915 by detecting a transition from the OFF 615 period to the ON 605 period. The signal that indicates the start of the ON 605 period can be a CRS in the first sub-frame of the ON 605 period. The first LTE-U cell 910 sets $t_s$ 930 to be the detected starting time of the ON 605 period of the second LTE-U cell 915. If no second LTE-U cell 915 is detected, the first LTE-U cell 910 can choose $t_s$ 930 on its own.

Step 3: The first LTE-U cell 910 sets the starting sub-frame of its own on-off cycle by:

$$k' = \min_k \{abs(s(k) - t_s)\}, \quad (5)$$

where s(k) is the start time of sub-frame k. The start times of the periodic on-off cycle of the first LTE-U cell 910 is determined to be s(k')+n. P-CYCLE-x, where n= 0, 1, 2, 3, . . . .

The on-off cycle alignment 900 procedure as described in Embodiment 1, Method 2 can also be applied in case there are multiple possible on-off cycle durations, as follows:

Step 1: UE 116 connected with the first LTE-U cell 910 detects any existing LTE-U signals by detecting PSS and the SSS transmitted by any existing LTE-U cells. PSS and SSS are transmitted during the ON 605 period of LTE-U cells. This step determines the presence of any LTE-U cell on a given frequency.

Step 2: when a second LTE-U cell 915 is detected, UE 116 connected with the first LTE-U cell determines the second LTE-U cell's start of on-off cycle by detecting a transition of off period to on period. The signal that indicates the start of the ON 605 period can be CRS in the first sub-frame of the ON 605 period.

Step 3: UE 116 connected with the first LTE-U cell 910 reports information regarding the period of the second LTE-U cell 915 to the first LTE-U cell 910 such as by higher-layer signaling or layer-1 signaling. In certain embodiments, the cycle information is contained in a periodic or aperiodic measurement report or a new report format for on/off cycle information. One or more of the following information is included by UE 116:

The start time of the on period of the second LTE-U 915: $t_s$ 930;

The detected on-off period duration;

Cell ID, such as PCID; and

RSRP measurement of the second LTE-U cell 915.

Step 4: the first LTE-U cell 910 sets the detected start time of the ON 605 period of the second LTE-U cell 915 to be $t_s$ 930.

Step 5: the first LTE-U cell 910 sets the starting sub-frame of its own on-off cycle by:

$$k' = \min_k \{abs(s(k) - t_s)\}, \quad (6)$$

where s(k) is the start time of sub-frame k. The start times of the periodic on-off cycle of the first LTE-U cell is determined to be s(k')+n. P-CYCLE-x, where n= 0, 1, 2, 3, . . . .

Figure 12:
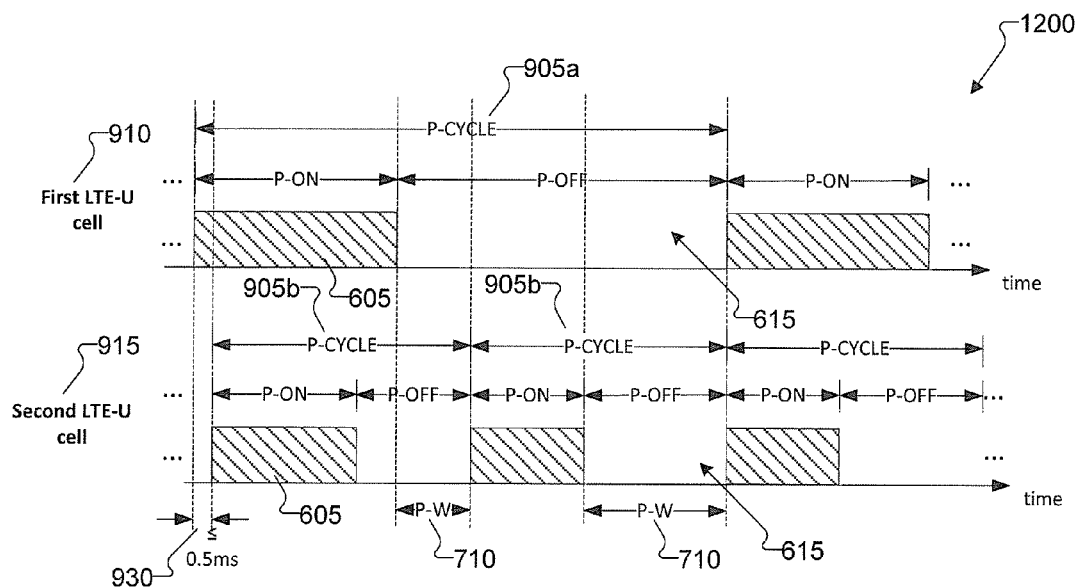
FIG. 12 illustrates LTE-U on-off cycle alignment with multiple P-CYCLEs according to this disclosure.

FIG. 12 illustrates LTE-U on-off cycle alignment with multiple P-CYCLEs according to this disclosure. Error! Reference source not found. Other examples could be used without departing from the scope of the present disclosure. For example, although two cells are illustrated as example, this embodiment can be extended in a straightforward manner to cases where there are more than two LTE-U cells.

FIG. 12 illustrates an example result of on-off cycle alignment 1200 after completion of the described procedure, where the first LTE-U cell's P-CYCLE 905a is two times that of the second LTE-U cell 905b. In certain embodiments, due to a difference in an ON 605 period for the first LTE-U cell 910 and one or more ON 605 periods for the second LTE-U cell 915, the time period P-W 710 that is free from LTE-U interference can vary is duration.

Certain embodiments (Embodiment 3) provide an Inter-operator co-channel interference avoidance method.

The previous two embodiments described procedures for cycle alignment provide efficient operation when sharing between LTE-U cells of multiple operators as well as potential other wireless broadband systems. Another mode of efficient operation can be performed when other wireless broadband systems are not present and only LTE-U (single or multi-operator) coexistence is required. Cycle alignment may not be desired and instead cycle orthogonality between cells may be preferred due to the reduction of interference between cells by aligning the on period of a cell with an OFF 615 period of neighboring cells to various extents. Another example when channel orthogonalization among LTE-U cells is beneficial is when the interference from a first LTE-U cell 910 of operator-1 to a second LTE-U cell 915 of operator-2 is above an acceptable level, which can occur for downlink when a user of the first LTE-U cell 910 comes too close to the second LTE-U cell 915 while the second LTE-U cell 915 is transmitting. This is illustrated in FIG. 13.

Figure 13:
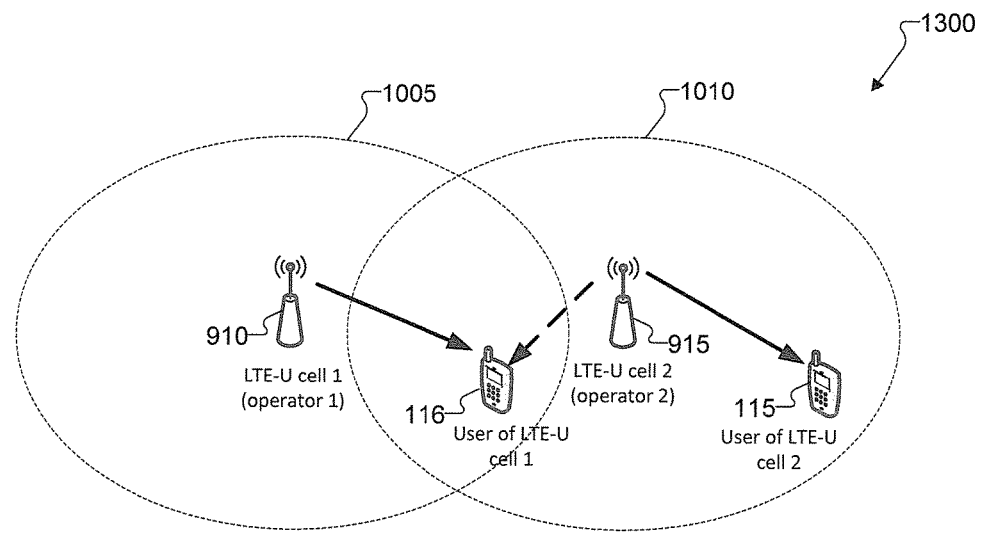
FIG. 13 illustrates Inter-operator interference according to this disclosure.

FIG. 13 illustrates inter-operator interference according to this disclosure. The embodiment of the inter-operator interference 1300 shown in FIG. 13 is for illustration only. Other embodiments could be used without departing from the scope of the present disclosure.

The first LTE-U cell 910, which is operated by operator 1, is serving UE 116. The second LTE-U cell 915, which is operated by operator 2, is serving UE 115. The first LTE-U cell 910 has a transmission coverage 1005 and the second LTE-U cell 915 has a transmission coverage 1010. Due to the close proximity of UE 116 to the second LTE-U cell 915, UE 116 experiences high interference from the second LTE-U cell 915

In certain embodiments, the methods of Embodiment 1 and Embodiment 2 can be extended or modified in this case by replacing detection and reporting of the ON 605 period instance $t_s$ 930 by $t_{s\_off}$, where $t_{s\_off}$ is the start of the OFF 615 period of the cycle for a given LTE-U cell. The first LTE-U cell 910 in the procedures described in Embodiment 1 and Embodiment 2 can set the starting sub-frame of its own on-off cycle to be:

$$\text{sub-frame } k' = \min_k \{abs(s(k) - t_{s\_off})\} \quad (7)$$

where s(k) is the start time of sub-frame k, or the first sub-frame after $t_{s\_off}$. The start times of the periodic on-off cycle of the first LTE-U cell 910 is determined to be s(k')+n. P-CYCLE, where n=0, 1, 2, 3, . . . .

In certain embodiments, when a LTE-U cell determines that other RATs do not exist, the LTE-U cell does not perform the cycle alignment procedure. As a result there can be random offset between the on-off cycles of different LTE-U cells. Inter-cell interference can be reduced on average compared to that of the cycle alignment procedure since the ON 605 periods of LTE-U cells are not always coinciding.

In certain embodiments, the start time of ON 605 period is randomly hopped within the on-off cycle according to a pseudo-random sequence. For example, suppose there are M sub-frames within the on-off cycle, labelled sub-frame 0 to M−1, the start time of the ON 605 period for each on-off cycle (n) can be determined to be R(n) mod M, where R(n) is a pseudo-random sequence. In certain embodiments, initialization of R(n) is fixed or based on one or more cell-specific or operator-specific parameters, such as Physical Cell Identifier (PCID) or Public Land Mobile Network (PLMN) identifier (ID). In another example, the initialization of R(n) is based upon transmission parameters such as on-off cycle number, duration, or period, as well as SFN or sub-frame number.

In certain embodiments, the selection of the pseudo-random offset is performed every on-off cycle or is fixed for $X_{R(n)}$ on-off cycles, where $X_{R(n)}$ is preconfigured or selected by eNB 102 or another coordinating node. In another example, the pseudo-random offset falls within a range $M_{min}$ and $M_{max}$, where and $M_{max}$ are preconfigured or selected by eNB 102 or another coordinating node.

In addition, in certain embodiments, adjustment of the offset is applied after selection depending upon detection of a node of another RAT or operator. For example, when a second LTE-U node is detected to be operating on a partially or fully overlapped ON 605 duration as a first LTE-U cell 910 node, the first LTE-U cell 910 node adjusts the offset with a deterministic shift of floor((R(n) mod M)/2) or min(floor((R(n) mod M)/2), M) in order to attempt to further increase overlap of the ON 605 durations or to provide some interference avoidance by decreasing the overlap.

The decision by a cell of whether to apply cycle alignment or orthogonality or randomization based on the above embodiments can be informed by measurements of the activity and type of neighboring cells. For example, energy detection, LTE cell detection, and Wi-Fi carrier detection methods can be employed by the base stations (namely, eNBs) and possibly connected UEs configured for reporting to determine the cycle selection method.

In certain embodiments, mitigating inter-operator interference as illustrated in FIG. 13 includes enabling a LTE-U cell to avoid selecting an operating channel that is already occupied by another LTE-U cell that is not operated by the same operator. This can be achieved by PLMN identification of neighboring LTE-U cells.

In one method, LTE-U cells transmit PBCH that carries Master Information Block (MIB) and transmit PDSCH carrying System information block-1 (SIB1), including the corresponding scheduling PDCCH, on available unlicensed channels. SIB1 includes a list of PLMN identities where the first listed PLMN identity is the primary PLMN. The cell, such as eNB 102 or AP 400, detecting the presence of the transmitting LTE-U cell uses only the MIB and SIB1 to detect that the LTE-U cell is present and is associated with a different operator. For example, eNB 102 uses information blocks consisting of MIB and SIB1 to detect the LTE-U operated by another operator and having an overlapping coverage area. The LTE-U cells need not support standalone operating or need not support idle mode camping; hence the LTE-U cells need not transmit the other SIBs, namely, SIB2, SIB3, and so forth. In another method, there can be a new system information (SI) broadcast transmission defined for the purpose of PLMN identification. In one example, the PLMN identity can be additionally included in the MIB by utilizing the spared bits in the Rel-11 MIB; in this case SIB1 may not need to be transmitted. In another method, the information about the presence of LTE-U cells operated by an operator can be broadcasted on a licensed carrier. For example, a new SIB can be introduced or a current SIB can be extended to include such information. The information can include the operating frequency, the system bandwidth, the PLMN identity, the LTE-U cell id (PCID) and other information that can be useful to assist co-existence, for example, transmission schedule, such as scheduled on time, on-off cycle.

In the case MIB and SIB1 are transmitted by LTE-U cells, the transmission of MIB and SIB1 by LTE-U cells can be according to LTE Rel-11. Specifically, the MIB uses a fixed schedule with a periodicity of 40 ms and repetitions made within 40 ms. The first transmission of the MIB is scheduled in sub-frame #0 of radio frames for which the SFN mod 4=0, and repetitions are scheduled in sub-frame #0 of all other radio frames. The SIB1 uses a fixed schedule with a periodicity of 80 ms and repetitions made within 80 ms. The first transmission of SIB1 is scheduled in sub-frame #5 of radio frames for which the SFN mod 8=0, and repetitions are scheduled in sub-frame #5 of all other radio frames for which SFN mod 2=0. The MIB and SIB1 transmissions according to the fixed schedule may also only occur intermittently, or may also occur upon instruction by a co-existence manager module. In case of intermittent transmission, the periodicity can be a multiple of the fixed schedule applied on the licensed carrier. For example the MIB transmission can be performed every 40(x) ms and SIB1 transmissions every 80(y) ms where x and y are positive integers that are preconfigured or selected by eNB 102 or another coordination entity. In another example, the same fixed schedule is applied to initial MIB and SIB1 transmissions, but repetitions are not transmitted.

In another alternative, the broadcast message(s) carrying the PLMN identity transmission, for example, MIB, SIB1, or new SI broadcast message, are transmitted on a schedule relative to the P-CYCLE 905 or P-ON duration periodicity of a cell or set of cells. For example, the MIB can be transmitted on a LTE-U cell in the first frame of an LTE-U ON period in sub-frame #0 or sub-frame #5, while SIB1 is transmitted in the second frame of an LTE-U ON 605 period in sub-frame #0 or sub-frame #5. Additionally the periodicity of the transmissions can be multiples of on-off cycles, for example, every four on-off-cycles.

In another alternative, the broadcast message(s) carrying the PLMN identity transmission, for example, MIB, SIB1, or new SI broadcast message, are transmitted within a LTE-U SI Window. The duration of the window $W_D$ can be configured such that successful transmission of at least one MIB and SIB1 message is possible within a given period $W_P$. In one example, $W_D$=80 ms and $W_P$=640 ms. The location of the SI transmissions within the window can be fixed, such as in the first on-off cycle(s) of the SI Window, or configurable for a cell or given set of cells depending on the selected on-off cycle transmission parameters. For example a set of four cells can have a SI Window period of $W_P$=320 ms and duration $W_D$=80 ms and each cell is configured with or selects an offset, such as n={0, 1, 2, 3}ms such that the SI transmission is applied starting with n+$W_D$ from the starting sub-frame of the SI Window, creating four non-overlapping SI transmission durations within the window.

Additionally the SI Windows can be periodic with a fixed offset between SI Window instances of $X_{window}= \{0, 1, 2 \ldots \text{MaxWindowOffset}\}$ (sub-)frames or ms, on a preconfigured basis or configurable by eNB 102 or another coordination entity. The transmission of these LTE-U SI Windows for a given set of cells controlled by the same operator can be coordinated to be non-overlapping or only partially overlapping with the LTE-U SI Windows for a given set of cells controlled by a different operator. The periodicity of the LTE-U SI Windows also can be coordinated between operators via preconfiguration or backhaul.

Before transmission on a channel, an LTE-U cell can attempt to detect the MIB and the SIB1, or a new SI broadcast message, of neighboring LTE-U cells on the channel in order to obtain the PLMN identities of the neighboring LTE-U cells. The detection of SI can be performed on the unlicensed carrier concerned if the SI is broadcasted on the unlicensed carrier, or it can be performed on a licensed carrier if the SI is broadcasted on the licensed carrier. Detection of the MIB and the SIB1 involves cell discovery, such as PCID detection, detection of PBCH and detection of PDCCH, where CRC is scrambled by SI-RNTI, that schedules the PDSCH that carries SIB1. If one or more LTE-U cells do not have the same PLMN identity as the LTE-U cell performing SI detection, the LTE-U cell does not select the channel for transmission and considers another channel for transmission instead. In another example, the LTE-U cell does not select the channel for transmission when one or more LTE-U cells do not have the same PLMN identity as the LTE-U cell performing MIB and SIB1 detection, and when one or more of the LTE-U cells' measured signal strength is above a certain threshold.

Instead of detection of MIB and SIB1 of neighboring LTE-U cells by eNB 102, eNB 102 can also configure UE 116 to perform RRM measurement, including cell detection, and report CGI of neighboring LTE-U cells on the corresponding carrier frequency. Upon detection of a LTE-U cell, UE 116 includes in its measurement report, the measurement results, such as reference signal received power (RSRP)/reference signal received quality (RSRQ), the PCID, the CGI, including the primary PLMN identity, and the other additional PLMN identities broadcasted in SIB1. When there is one or more cell in a UE report that does not have the same PLMN identity as the LTE-U cell configuring the UE measurement, the LTE-U cell does not select the channel for transmission and consider another channel for transmission instead. In another example, the LTE-U cell does not select the channel for transmission when one or more LTE-U cells do not have the same PLMN identity as the LTE-U cell configuring the UE measurement, and when one or more of LTE-U cells' signal strength from the reported RSRP/RSRQ is above a certain threshold.

In another example, assume the LTE-U cell keeps a list of PCIDs used by the same operator, when radio resource management (RRM) measurement without CGI reporting is configured to UE 116, the LTE-U cell can check if there is any PCID reported by the UE that is not included in the list of PCIDs. When a PCID that is not included in the list is reported, the LTE-U cell does not select the channel for transmission and considers another channel for transmission instead. In another example, the LTE-U cell does not select the channel for transmission when there is any PCID reported by UE 116 that is not included in the list of PCIDs, and when the corresponding LTE-U cell's signal strength from the reported RSRP/RSRQ is above a certain threshold.

In another method, the information about the LTE-U cells operated by the same operator is signaled via backhaul to a LTE-U cell. The information allows or assists an LTE-U cell receiving the information to recognize when another LTE-U cell detected belongs to the same operator or not, and enables the LTE-U cell to perform its co-existence procedure. The detection of another LTE-U cell can be done by the eNB 102 or by UE 116, which is then reported to the eNB 102, as described previously. The information signaled via backhaul includes one or more of the following for each LTE-U cell operated by the same operator: operating frequencies, the PCIDs, the system bandwidth, DL/UL transmission schedule, such as scheduled on time, on-off cycle duration, transmission duty cycle, SI broadcast schedule, discovery signal transmission configuration, of the LTE-U cells by the same operator. The information provides the LTE-U cell prior knowledge of the other LTE-U cells from the same operator. When a detected LTE-U cell does not match the prior knowledge, the detected LTE-U cell can be determined to be from a different operator.

In another method, the information about the presence of LTE-U cells operated by one or more operator can be delivered via backhaul to a LTE-U cell. The information allows an LTE-U cell receiving the information to perform its co-existence procedure. The information signaled via backhaul can include one or more of the following for each operator: operating frequencies, the PLMN identities, the PCIDs, the system bandwidth, DL/UL transmission schedule, such as scheduled on time, on-off cycle duration, transmission duty cycle, SI broadcast schedule, discovery signal transmission configuration, of the LTE-U cells by each operator. The task of collecting and distributing information can be performed by a centralized coordinator module such as a co-existence manager module.

Figure 14:
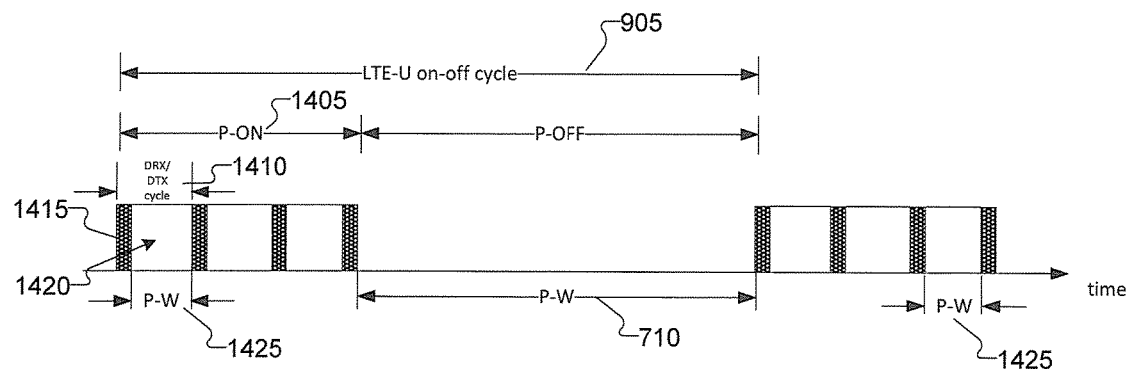
FIG. 14 illustrates a DRX/DTX configuration for an LTE-U cell according to this disclosure.

FIG. 14 illustrates a discontinuous reception (DRX)/discontinuous transmission (DTX) configuration for an LTE-U cell according to this disclosure. The embodiment of the DRX/DTX configuration 1400 shown in FIG. 14 is for illustration only. Other embodiments could be used without departing from the scope of the present disclosure.

Certain embodiments (Embodiment 5) provide an LTE-U on-off by UE DRX configuration:

P-ON 1405 of an LTE-U cell can potentially be tens or hundreds of milliseconds long. As a result, LTE-U interference may prevent other RATs, such as Wi-Fi, from accessing the wireless channel for an excessively long period of time, which could also trigger exponential back-off by the Wi-Fi AP. In addition, TCP congestion control mechanism may potentially be triggered. These congestion control mechanisms can significantly degrade the performance of Wi-Fi. Therefore, embodiments of the present disclosure provide a system and method to mitigate channel access delay by RATs sharing the same channel as one or more LTE-U cells.

To this end, DRX can be configured for UE 116 such that DRX cycles 1410 can take place during the ON 605 period, namely in P-ON 1405 in the P-CYCLE 905, of the LTE-U cell. UE 116 configured with DRX only monitors PDCCH and can receive PDSCH during the ON period 1415 of a DRX cycle 1410. In order to save power, UE 116 can switch off its receiver during the OFF period 1420 of a DRX cycle. The LTE-U cell can also mute its transmission during the OFF period 1420 of a DRX cycle. In other words, the DRX cycle 1410 of UE 116 is also the DTX cycle 1410 of the LTE-U cell. The off duration of DRX/DTX cycles 1410 creates additional opportunities for Wi-Fi APs and other RATs to access the channel, such as during time periods P-W 1425 occurring in addition to time periods P-W 710; thus reduces channel access delay. Moreover, the LTE-U cell can also measure the radio activities during these extra off periods, time period P-W 1425, and use the measurement result to adapt the on-off pattern as well as the DRX/DTX configuration subject to a co-existence performance criterion and a LTE-U performance criterion.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A wireless transmission point, comprising:
    at least one antenna configured to communicate with a plurality of mobile terminals; and
    processing circuitry configured to:
        adjust an ON-OFF cycle operation of the at least one antenna, wherein the ON-OFF cycle operation comprises an ON period during which the at least one antenna transmits data and control signals, and an OFF period in which one of: no signals are transmitted and only discovery reference signals are transmitted;
        detect data and control signals transmitted from at least one other transmission point;
        determine a start of an ON-OFF cycle operation of the at least one other transmission point,
        align the ON-OFF cycle operation of the at least one antenna with the ON-OFF cycle operation of the at least one other transmission point, and
        detect a master information block (MIB) and a system information block (SIB1) of the at least one other transmission point on a channel in order to obtain public land mobile network (PLMN) identities of the at least one other transmission point from SIB1,
    wherein the wireless transmission point is associated with a first operator and the at least one other transmission point is associated with a second operator, and wherein the first operator is different than the second operator.

2. The wireless transmission point as set forth in claim 1, wherein the processing circuitry is configured to align the ON-OFF cycle operation by setting a starting sub-frame of the ON-OFF cycle operation of the at least one antenna to be within a time offset from the ON-OFF cycle operation of the at least one other transmission point.

3. The wireless transmission point as set forth in claim 1, wherein the processing circuitry is configured to detect data and control signals transmitted from the at least one other transmission point by receiving, via the at least one antenna, a detection report from at least one of the plurality of mobile terminals, the detection report configured to indicate that the at least one of the plurality of mobile terminals was detected based on one or more of primary synchronization signals (PSS) or secondary synchronization signals (SSS) transmitted by the at least one other transmission point,
    wherein the detection report comprises at least one of: information regarding a period of the at least one other transmission point, a start time of an ON period of the at least one other transmission point, the timing offset, a detected ON-OFF period duration of at least one other transmission point, a cell identifier, or a reference signal received power (RSRP) measurement of the at least one other transmission point.

4. The wireless transmission point as set forth in claim 1, wherein the data and control signals include at least one of: a primary synchronization signal (PSS), a secondary synchronization signal (SSS), common reference signal (CRS), downlink modulation reference signal (DMRS), physical downlink shared channel (PDSCH) signals, physical downlink control channel (PDCCH) signals, enhanced-physical downlink control channel (EPDCCH) signals, or channel state information reference signal (CSI-RS).

5. The wireless transmission point as set forth in claim 1, wherein the wireless transmission point does not select the channel for transmission if the at least one other transmission point does not have the same PLMN identity as the wireless transmission point.

6. The wireless transmission point as set forth in claim 1, wherein the processing circuitry is configured to at least one of:
    align the ON-OFF cycle operation by setting a starting sub-frame of the ON-OFF cycle operation of the at least one antenna to be within a time offset from a start of an OFF period of the at least one other transmission point;
    align the ON-OFF cycle operation orthogonally by aligning the ON period of the at least one antenna with an OFF period of the at least one other transmission point; or
    align the ON-OFF cycle operation by randomly hopping a start time of the ON period within the ON-OFF cycle operation of the at least one antenna according to a pseudo-random sequence.

7. The wireless transmission point as set forth in claim 5, wherein the wireless transmission point does not select the channel for transmission if a measured signal strength of the at least one other transmission point is above a threshold.

8. The wireless transmission point as set forth in claim 7, wherein the processing circuitry is configured to mitigate inter-operator interference by avoiding selecting an operating channel that is already occupied by the at least one other transmission point.

9. A mobile terminal, comprising:
    at least one antenna configured to communicate with at least one access point (AP); and
    processing circuitry configured to:
        send and receive data with the at least one AP, and
        in response to detecting a master information block (MIB) of at least one other transmission point, send a detection report to the at least one AP, the detection report configured to enable the at least one AP to align an ON-OFF cycle operation with the at least one other transmission point, wherein the ON-OFF cycle operation comprises an ON period during which the at least one AP transmits data and control signals, and an OFF period in which one of: no signals are transmitted and only discovery reference signals are transmitted,
    wherein a system information block (SIB1) of the at least one other transmission point on a channel indicate public land mobile network (PLMN) identities of the at least one other transmission point, and
    wherein the at least one AP is associated with a first operator and the at least one other transmission point is associated with a second operator, and wherein the first operator is different than the second operator.

10. The mobile terminal as set forth in claim 9, wherein the processing circuitry is configured to detect one or more of: primary synchronization signals (PSS) or secondary synchronization signals (SSS), transmitted by the at least one other transmission point.

11. The mobile terminal as set forth in claim 9, wherein the processing circuitry is configured with an ON-OFF cycle reporting configuration, the ON-OFF cycle reporting configuration comprises one or more of: a set of cell IDs for monitoring, time/frequency resources for monitoring neighboring cells on/off cycle, and a reference signal received power (RSRP) threshold for triggering reporting.

12. The mobile terminal as set forth in claim 9, wherein the detection report comprises at least one of: information regarding a period of the at least one other transmission point, a start time of an ON period of the at least one other transmission point, the timing offset, a detected ON-OFF period duration of at least one other transmission point, a cell identifier, a reference signal received power (RSRP) measurement of the at least one other transmission point, a measurement report, measurement results, a physical cell identifier (PCID), a cell global identifier, a CGI public land mobile network (PLMN) identifier, or other additional PLMN identities broadcasted in an system information block (SIB1).

13. The mobile terminal as set forth in claim 9, wherein the processing circuitry is configured with a discontinuous receive (DRX) mode, and wherein in the DRX mode, the processing circuitry is configured to receive during DRX cycles occurring during the ON period of the at least one AP.

* * * * *